(12) United States Patent
Noma

(10) Patent No.: US 7,162,409 B2
(45) Date of Patent: Jan. 9, 2007

(54) DIAGNOSTIC SYSTEM, DIAGNOSTIC DEVICE AND DIAGNOSTIC METHOD

(75) Inventor: Hideki Noma, Kanagawa (JP)

(73) Assignee: Sony Corporation, Tokyo (JP)

( * ) Notice: Subject to any disclaimer, the term of this patent is extended or adjusted under 35 U.S.C. 154(b) by 1109 days.

(21) Appl. No.: 09/914,408

(22) PCT Filed: Dec. 28, 2000

(86) PCT No.: PCT/JP00/09418

§ 371 (c)(1),
(2), (4) Date: Aug. 27, 2001

(87) PCT Pub. No.: WO01/50265

PCT Pub. Date: Jul. 12, 2001

(65) Prior Publication Data

US 2002/0138822 A1    Sep. 26, 2002

(30) Foreign Application Priority Data

Dec. 30, 1999  (JP)  ............................. 11-377278

(51) Int. Cl.
*G06F 9/455* (2006.01)
(52) U.S. Cl. ...................... 703/27; 702/183
(58) Field of Classification Search .............. 703/27; 700/254, 245; 180/7.1; 702/183
See application file for complete search history.

(56) References Cited

U.S. PATENT DOCUMENTS 4,362,977 A * 12/1982 Evans et al. ............... 700/254
5,715,388 A * 2/1998 Tsuchihashi ................ 714/46
6,896,078 B1 * 5/2005 Wakui ......................... 180/7.1

FOREIGN PATENT DOCUMENTS

| EP | 0 874 297 A1 | 10/1998 |
|----|---|---|
| EP | 0 924 034 A2 | 6/1999 |
| JP | 362212705 A * | 9/1987 |
| JP | 404047412 A * | 2/1992 |
| JP | 5-35751 | 2/1993 |
| JP | 407311618 A * | 11/1995 |
| JP | 10-49221 | 2/1998 |
| JP | 10-124131 | 5/1998 |
| JP | 10-222564 | 8/1998 |
| JP | 11-188678 | 7/1999 |
| WO | WO 98/18065 | 4/1998 |

OTHER PUBLICATIONS

Hiromi Kaneko "Analyze "Pet Robot"" Monthly Electronics Magazine Mar. 1998.

* cited by examiner

*Primary Examiner*—Albert W. Paladini
(74) *Attorney, Agent, or Firm*—Frommer Lawrence & Haug LLP; William S. Frommer; Darren M. Simon

(57) ABSTRACT

Data necessary for diagnosing the condition of software of a virtual living thing or the condition of a hardware keeping the virtual living thing are acquired from the hardware or a storage medium storing the software, and are analyzed, and the condition of the virtual living thing is diagnosed on the basis of the analysis result. Besides, data necessary for diagnosing the hardware or the software of a robot apparatus are acquired from the robot apparatus or the storage medium storing the software, and are analyzed, and the condition of the robot apparatus is diagnosed on the basis of the analysis result.

32 Claims, 17 Drawing Sheets

CONNECT PET ROBOT OR BUILT-IN STORAGE MEDIA TO PC.
START DIAGNOSIS?

51A — YES      51B — NO

- - - - - - - - - - - - - - - - - - - - - - - - - - - - - - - - - -

DIAGNOSIS FINISHED

Age:     Love to Owner:
45 Days — 52A        25% — 52D
Phase:   Love to Item:
Young — 52B          75% — 52E
Type:
Lazy — 52C

IQ

Average Line
Your Pet
Age
55

Total Point: 45pts — 54

COMMENT:
IQ IS A BIT LOW FOR AGE: I SUPPOSE IT IS DUE TO BRINGING UP HIM INDULGENTLY.
A LITTLE WILD. HE MAY REGARD YOU AS A JUST STICK ON A ROAD.

DO YOU START COUNSELING?

56A — YES     56B — NO

THE RESULT OF THE CONSELING IS AS FOLLOWS

YOUR PET IS SOMEWHAT NAUGHTY, AT PRESENT. IT IS DEEMED THAT SUCH A CONDITION HAS RESULTED FROM LACK OF COMMUNICATION WITH YOU.
FOR RECOVERY REASONABLENESS, IT IS ADVISABLE TO PLAY WITH HIM FOR 10 MINS EVERY DAY UTILIZING SOME ITEM THAT HE IS FOND OF, SUCH AS A BALL.
STATR WITH AN ITEM THAT ATTRACTS HIM POWERFULLY, AND GRADUALLY TRY TO COMMUNICATE WITH HIM DIRECTORY USING YOUR VOICE AND YOUR HANDS OR SO.

HE WILL GRADUALLY REMEMBER YOU AND PAY HIS RESPECTS TO YOU BY AND BY.

AS TO HIS GROWTH, IT IS NOT NEEDED TO TROUBLE YOURSELF FOR THE TIME BEING, BECAUSE THE SIGNS OF GROWTH ARE NOT FOUND.
PLEASE TOUCH HIM

BE A LOVELY PARTNER

---

COUNSELING CHARGE OF THIS TIME

```
ADDRESS
〒141-0001
TO PET ROBOT REPAIR SERVICE
SHINAGAWA, TOKYO...

SENDER
〒141-00??
TO...
TOKYO..

DATE OF DIAGNOSIS:        1999/12/27
NUMBER FOR DIAGNOSIS:        00456

SERIAL NO. OF PET ROBOT:   AI000987
PROBLEM:                   FRONT-RIGH LEG UNIT
```

FIG. 19

DIAGNOSTIC SYSTEM, DIAGNOSTIC DEVICE AND DIAGNOSTIC METHOD

TECHNICAL FIELD

The present invention relates to a diagnostic system, a diagnostic device and a diagnostic method, and suitably applicable to, for instance, a diagnostic system for diagnosing a pet robot in a network.

BACKGROUND ART

In recent years, many entertainment robots, stuffed toys and the like that would autonomously act in response to external inputs, a situation of the circumference and the like have been commercialized. Besides, a plenty of characters have came on the market that are not having any entity like those in the three-dimensional space, and are retained as software in a personal computer, a game machine and a portable terminal device such as a portable telephone, and would autonomously act on the display of these personal computer and a portable terminal device.

Hereinafter, such a character that is retained, as software, in hardware having a storage medium such as a personal computer, a portable terminal device, an entertainment robot, a stuffed toy and the like, and that is programmed so as to act or behave on the basis of the software is designated as a virtual living thing.

By the way, in such a virtual living thing, its action and its growth are processed in a manner that is based on software. Accordingly, for instance, in the case where the values of the controlling parameters related to the action and the growth change with time, such a problem exists that it is difficult for the user to recognize how is the current condition of the action and/or the growth of the virtual living thing. Besides, in the case where a robot, a stuffed toy or the like has a problem, it is sometimes hard to recognize what is the problem.

So, if a user is able to easily recognize the internal situation and the problem in the virtual living thing and/or a robot, he can handle the virtual living thing and/or the robot easily.

DESCRIPTION OF THE INVENTION

The present invention is made in view of aforementioned respects, and is aiming at proposition of a diagnostic system, a diagnostic device and diagnostic method, which can make handling of a virtual living thing or a robot easy.

In order to solve such problems, in a diagnostic system, first communication means provided on a user side of a virtual living thing transmits data for diagnosis which is necessary for diagnosing software of the virtual living thing or hardware keeping the virtual living thing, through a communication line to second communication means on a service providing side, and the second communication means analyzes the data for diagnosis, which is given from the first communication means, and diagnoses the software of the virtual living thing or the hardware keeping the virtual living thing, on the basis of the analysis result. As a result, the diagnostic system is capable of recognizing the condition of the virtual living thing, thus making it possible to realize a diagnostic system which can make the handling of the virtual living thing easy.

Further, in the present invention, a diagnostic method is provided with: a first step of transmitting data for diagnosis which is necessary for diagnosing software of a virtual living thing or hardware keeping the virtual living thing, from a first communication means provided on the user side of the virtual living thing to a second communication means provided on the service providing side; and a second step of analyzing the data for diagnosis, which is given from the first communication means, by the second communication means, and of diagnosing software of the virtual living thing or hardware keeping the virtual living thing, on the basis of the analysis result. As a result, the condition of the virtual living thing can be recognized easily by the diagnostic method, thus making it possible to recognize a diagnostic method which can make the handling of a virtual living thing easy.

Further, in the present invention, a diagnostic device comprises: an analyzing means for acquiring data for diagnosis which is necessary for diagnosing software of a virtual living thing or hardware keeping the virtual living thing, from the hardware or a storage medium storing the software, and for analyzing the data; and a diagnosing means for diagnosing the condition of the virtual living thing, on the basis of the analysis result by the analyzing means. As a result, the condition of the virtual living thing can be recognized easily by the diagnostic method, thus making it possible to realize a diagnostic device which can make the handling of a virtual living thing easy.

Besides, in the present invention, a diagnostic method comprises: a first step of acquiring the data for diagnosis which is necessary for diagnosing software of a virtual living thing or hardware keeping the virtual living thing, from the hardware or a storage medium storing the software, and of analyzing the data; and a second step of diagnosing the condition of the virtual living thing, on the basis of the analysis result. As a result, the condition of a virtual living thing can be recognized easily by the virtual living thing, thus making it possible to recognize a diagnostic method which can make the handling of the virtual living thing easy.

Further, in the diagnostic system according to the present invention, a first communication means provided on the user side of a robot apparatus transmits data for diagnosis which is necessary for diagnosing the hardware or the software of a robot apparatus, through a communication line to a second communication means on the service providing side, and the second communication means analyzes the data for diagnosis, which is given from the first communication means, and diagnoses the hardware or the software of the robot apparatus on the basis of the analysis result. As a result, the condition of the hardware or the software of the robot apparatus can be recognized easily by the diagnostic system, thus making it possible to realize a diagnostic system which can make the handling of the robot apparatus easy.

Further, in the present invention, a diagnostic method comprises: a first step of transmitting data for diagnosis which is necessary for diagnosing software of the robot apparatus or hardware keeping the robot apparatus, from a first communication means provided on a user side of the robot apparatus to a second communication means provided on a service providing side; and a second step of analyzing the data for diagnosis, which is given from the first communication means, with the second communication means, and of diagnosing the software of the robot apparatus or the hardware keeping the robot apparatus on the basis of the analysis result. As a result, the condition of the hardware or the software of the robot apparatus can be recognized easily by the diagnostic system, thus making it possible to recognize a diagnostic method which can make the handling of the robot apparatus easy.

In addition, in the present invention, a diagnostic device which comprises: a first step of transmitting data for diagnosis which is necessary for diagnosing software of the robot apparatus or hardware keeping the robot apparatus, from a first communication means provided on a user side of the robot apparatus to a second communication means provided on a service providing side; and a second step of analyzing the data for diagnosis, which is given from the first communication means, with the second communication means, and of diagnosing the software of the robot apparatus or the hardware keeping the robot apparatus, on the basis of the analysis result. As a result, the condition of the software or the hardware can be recognized easily by the diagnostic device, thus making it possible to recognize a diagnostic device which can make the handling of the robot apparatus easy.

Furthermore, in the present invention, a diagnostic method comprises: a first step of acquiring data for diagnosis which is necessary for diagnosing hardware or software of a robot apparatus, from the robot apparatus or a storage medium storing the software, and analyzing the data; and a second step of diagnosing the condition of the robot apparatus, on the basis of the analysis result. As a result, the condition of the hardware or the software of a robot apparatus can be recognized easily by the diagnostic device, thus making it possible to realize a diagnostic method which can make the handling of a robot apparatus easy.

BRIEF DESCRIPTION OF THE DRAWINGS

FIG. 12 is a schematic diagram showing a character diagnosis panel.

FIG. 14 is a schematic diagram showing a counseling result display panel.

FIG. 19 is a schematic diagram showing a destination display panel.

BEST MODE FOR CARRYING OUT THE INVENTION

An embodiment of the present invention will be described in detail hereinafter with reference to the drawings.

(1) Configuration of a Pet Robot 1 of the Embodiment (1-1) General Configuration of the Pet Robot 1

Figure 1:
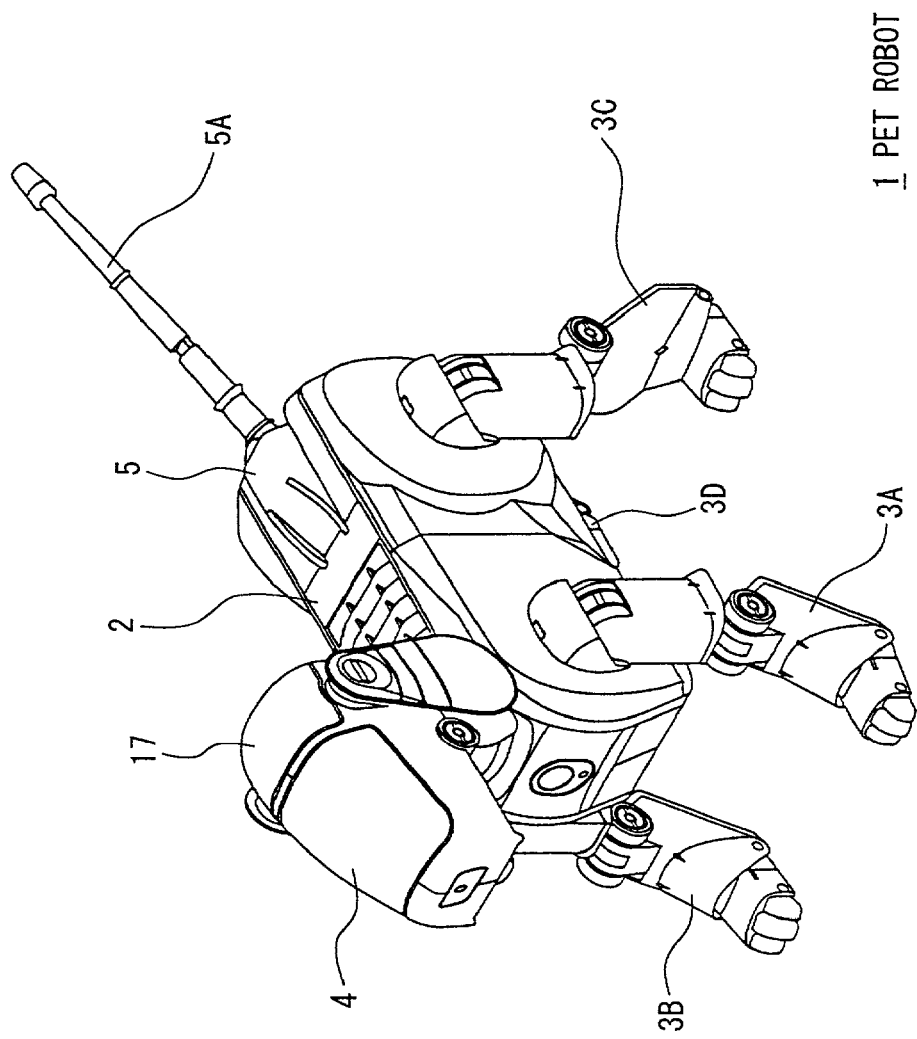
FIG. 1 is a perspective view showing an externally visual configuration of a pet robot according to the embodiment.

Referring to FIG. 1, a pet robot 1 according to the embodiment generally designated as 1 is composed such that leg units 3A to 3D are respectively linked to the front left, front right, rear left, and rear right portions of a body unit 2, and a head unit 4 and a caudal section unit 5 are respectively linked to the front end portion and the rear end portion of the body unit 2.

Figure 2:
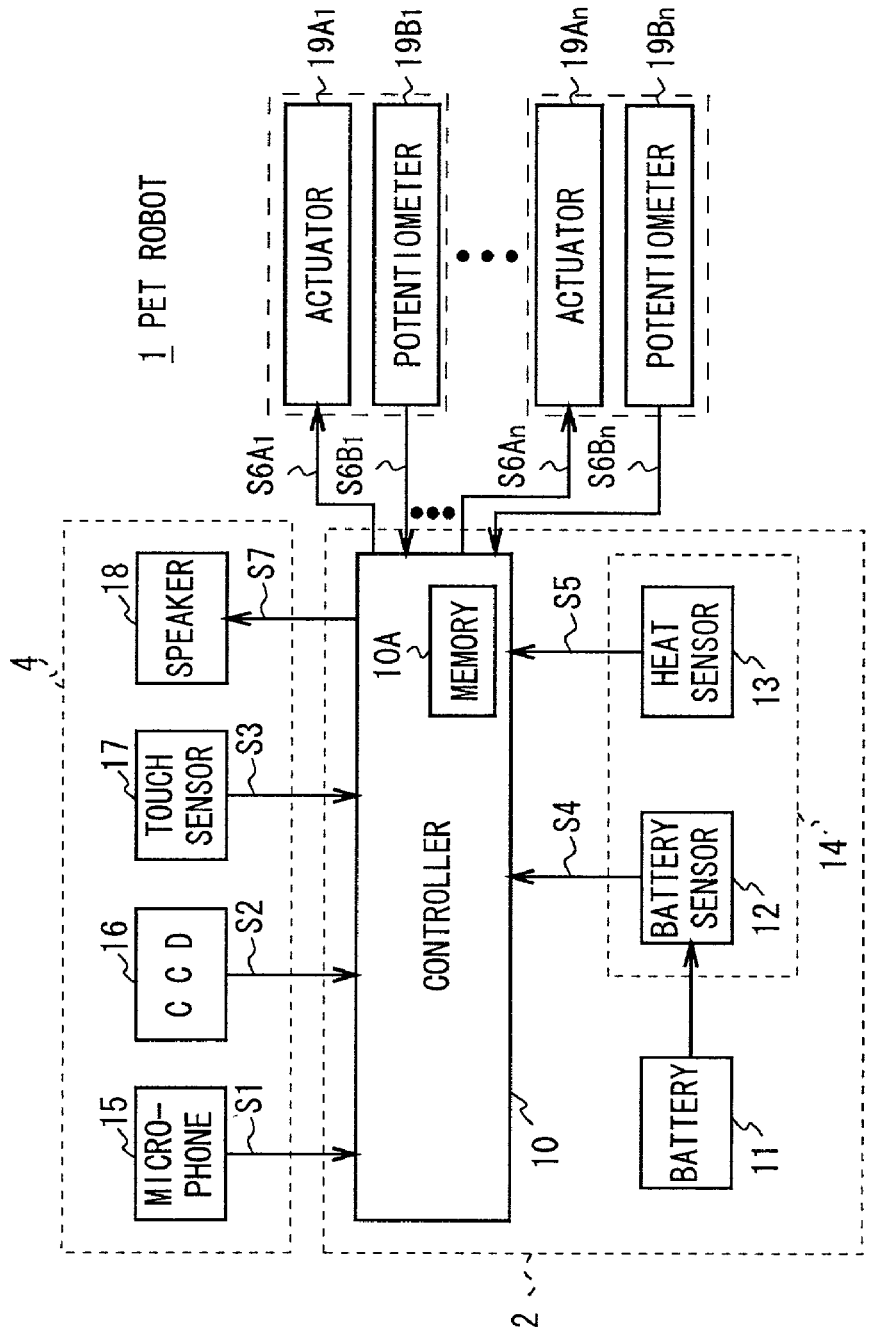
FIG. 2 is a block diagram showing a circuit configuration of a pet robot according to the embodiment.

In this case, as shown in FIG. 2, a controller 10 for controlling the behavior of the entire pet robot 1, a battery 11 that is the power source of this pet robot 1, an internal sensor division 14 that is comprised of a battery sensor 12 and a heat sensor 13, and the like are contained in the body unit 2.

Besides, a microphone 15 that corresponds to "ears" of this pet robot 1, a CCD (Charge Coupled Device) camera 16 that corresponds to "eyes", a touch sensor 17, a speaker 18 that corresponds to "mouse", and the like are placed at the conditiond positions of the head unit 4.

In addition, actuators $19A_1$ to $19A_n$ and potentiometers $19B_1$ to $19B_n$ are placed at the joint portions of the leg units 3A to 3D, the linkage portion of the body unit 2 and the leg units 3A to 3D, the linkage portion of the head unit 4 and the body unit 2, the linkage portion of the caudal section unit 5 and the body unit 2, and the like.

And, the microphone 15 of the head unit 4 picks up command sound such as "Walk", "Lie down", "chase the ball", and so on that is given from the user as musical scales with a sound commander, not shown, and then sends the obtained audio signal S1 to the controller 10. On the other hand, the CCD camera 16 shoots the situation of the circumference, and then sends the obtained image signal S2 to the controller 10.

In addition, the touch sensor 17, which is located at the upper portion of the head unit 4 as shown in FIG. 1, detects pressure that is given on the basis of the user's physical action such as "stroking" and "slapping", and then sends the detection result to the controller 10 as a pressure detection signal S3.

In addition, the battery sensor 12 of the body unit 2 detects the amount of remained power of the battery 11, and then sends the detection result to the controller 10 as a remained battery power detection signal S4. The heat sensor 13 detects the heat inside the pet robot 1, and then sends the detection result to the controller 10 as a heat detection signal S5.

In addition, the potentiometers $19B_1$ to $19B_n$ detects the rotational angle of the output shaft of the corresponding actuators $19A_1$ to $19A_n$, and then sends the detection result to the controller 10 as an angle detection signal $S6B_1$ to $S6B_n$.

On the basis of the audio signal S1, the image signal S2, the pressure detection signal S3, the remained battery power detection signal 4, the heat detection signal S5, the angle detection signal $S6B_1$ to $S6B_1$ and the like which are given from the microphone 16, the CCD camera 17, the touch sensor 18, the battery sensor 12, the heat sensor 13, and the potentiometers $19B_1$ to $19B_n$, the controller 10 checks the situation of the circumference, whether there is any user command and any user action, and the like.

And, the controller 10 determines the next action on the basis of the result of this check and a control program that has been previously stored in a memory 10A, and drives the necessary actuators $19A_1$ to $19A_n$ on the basis of the determination, so as to move the head unit 4 upwards, downwards, rightwards, and leftwards, and to move the tail 5A of the caudal section unit 5, and to drive the leg units 3A to 3D for walking.

Besides, at this time, the controller 10 causes the speaker 18 to output sounds based on the audio signal S7 to the exterior by giving the audio signal S7 to it as occasion requires, and/or causes LEDs (Light Emitting Diodes), not shown, that have been placed at the positions of the "eyes" of this pet robot 1 to go on, go off, or blink.

In this manner, this pet robot 1 is able to autonomously act on the basis of the situation of the circumference, the control program, and so on.

In addition to such a configuration, this pet robot 1 is adapted to varying its action and behavior as if a natural animal "grew", according to the history of the operator inputs such as influences from the user and commands given using a sound commander, as well as the history of the action and behavior of itself.

That is, this pet robot 1 is provided with four "growth stages": "a baby stage"; "a child stage"; "a youth stage"; and "an adult stage", as the growing process. And, for each of these "growth stages", the action and behavior model that is comprised of the various control parameters and control programs that form the foundations of the action and behavior related to four terms, "walking condition", "motion", "action" and "sounds", are previously stored in the memory 10A of the controller 10.

And, at the initial time, the controller 10 controls the actuator $19A_1$ to $19A_n$ and the sound outputs in accordance with the action and behavior model of "the baby stage"; as to "the walking condition" for instance, the controller 10 controls them so that the stride is diminished and it becomes "tottering steps", and as to "the motion", controls so that it becomes "simple" movement such as simple "walking", "standing" and "lying down", and as to "the action", controls so that it becomes "monotonous" action such as repetition of the same action, and as to "the sound", controls so that the amplification factor of the audio signal S6 is lowered and it becomes "low and short" sounds.

Besides, at this time, with respect to the previously determined plural factors related to "growth" (hereinafter, these are referred to as the growth factors) such as the command inputs that are given using a sound commander, the enhanced learning that is formed by the sensor inputs that correspond to "stroking" and "slapping" and that are given via the touch sensor 17 and the number of success of the determined action and behavior and the like, the sensor inputs that do not correspond to "stroking" and "slapping" and that are given via the touch sensor 17, the predetermined action and behavior such as "play with a ball" and the like, the controller 10 continuously monitors their generation and counts them.

On the basis of the cumulative frequency of these growth factors, when the total value of the cumulative frequency of the respective growth factors (hereinafter, this is referred to as the total experience value) exceeds the previously set threshold value, the controller 10 changes the action and behavior model that is used into the action and behavior model of "the child Stage" of which growth level (a level of difficulty and complexity of action and behavior) is higher than that of the action and behavior model of "the baby stage".

And, after this, the controller 10 controls each actuator $19A_1$ to $19A_n$ and the sound outputs from the speaker 18 in accordance with the action and behavior model of "the youth stage": as to "the walking condition" for instance, so that the rotational speed of each actuator $19A_1$ to $19A_n$ is accelerated and the pet robot 1 walks "somewhat securely"; and as to "the motion", so that the number of movement is increased and the motion become "somewhat high degree and complex"; and as to "the action", so that the next action is determined referring to the preceding action and it becomes the action having "some purposes"; and as to "the sound", so that the length of the audio signal S6 is lengthened and also the amplification factor is raised and hereby it becomes "somewhat long and large" sounds.

Besides, after this, in the same way as this, each time the total experience value of the growth factors exceeds the threshold values that have been previously set respectively in an associated manner with "the youth stage" and "the adult stage", the controller 10 sequentially changes the action and behavior model into the action and behavior model of "the youth stage" or "the adult stage" that have the higher growth level, and, in accordance with the very action and behavior model, gradually increases the rotational speed of each actuator $19A_1$ to $19A_n$ and/or the length or the amplification factor of the audio signal S6 that is given to the speaker 18, and changes the quantity of rotation of each actuator $19A_1$ to $19A_n$ of the time when one behavior is performed.

As a result of this, in accordance with proceeding of "the growth stage" (that is, changing of it from "the baby stage" into "the child stage", from "the child stage" into "the youth stage", from "the youth stage" into "the adult stage"), "the walking condition" of the pet robot 1 changes from "tottering steps" into "secure walking", and "the motion" of it changes from "simple" into "high degree and complex", and "action" of it changes from "monotonous" into "acts for purposes", and "sound" of it changes from "low and short" into "long and large", step by step.

In this manner, this pet robot 1 "grows" through four stages, "the baby stage", "the child stage", "the youth stage" and "the adult stage", in response to the input from the exterior and/or the histories of the action and the behavior of itself.

Figure 3:
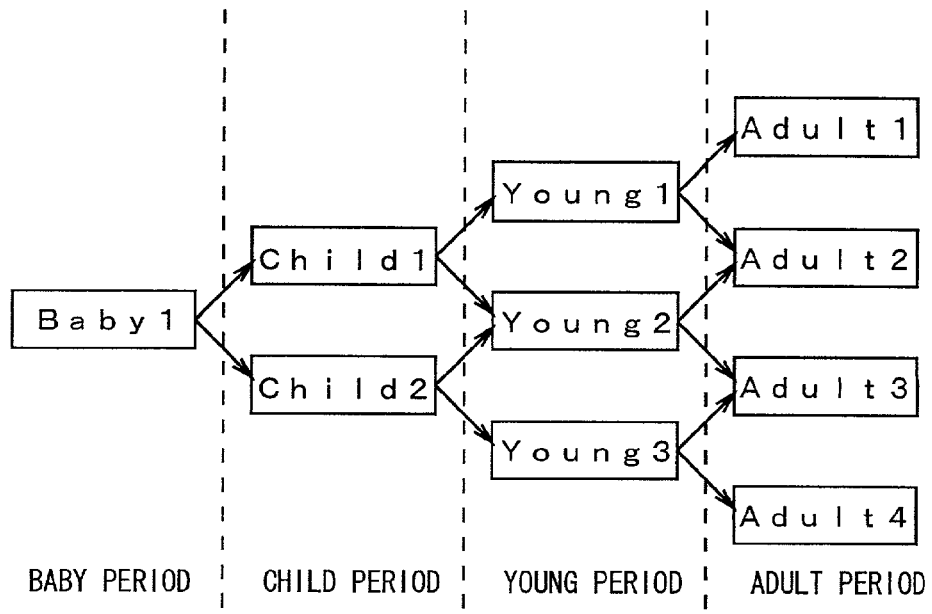
FIG. 3 is a conceptual diagram showing a growth model of the pet robot.

In the case of this embodiment, as shown in FIG. 3, a plurality of action and behavior models are prepared for each "growth stage" of "the child stage", "the youth stage" and "the adult stage".

In fact, as the action and behavior models of "the child stage" for instance, an action and behavior model (Child 1) of a "mischievous" temper that is rough and fast action and behavior and an action and behavior model (Child 2) of a "gentle" temper that is smoother and slower movement than that of the former are provided.

Besides, as the action and behavior models of "the youth stage", an action and behavior model (Young 1) of an "irritable" temper that would do still more rough and fast action and behavior than those of "mischievous" temper of "the child stage", an action and behavior model (Young 2) of a "usual" temper that would do slower and smoother action than that of the former, and an action and behavior model (Young 3) of a "gentle" temper that would do still more slow movement and less action than that of the former are provided.

In addition, as the action and behavior models of "the adult stage", an action and behavior model (Adult 1) of a "violent" temper that is more rough and fast action and behavior than those of "irritable" temper of "the youth stage" and that scarcely obeys the user commands, an action and behavior model (Adult 2) of a "somewhat violent" temper that is smoother and slower action and behavior than those of the former and that sometimes obeys the user commands, an action and behavior model (Adult 3) of a "somewhat mild" temper that is smoother, slower and less movement than that of the former and that certainly obeys the user commands, and an action and behavior model (Adult 4) of a "mild" temper that is more slow and less movement than that of the former and that certainly obeys the user commands are provided.

And, at the time that a "growth stage" is advanced, the controller 10 selects one action and behavior model out of the respective action and behavior models in the next "growth stage" on the basis of the cumulative frequency of the respective growth factors, and changes the current action and behavior model into the selected action and behavior model.

In this case, on and after "the child stage", at the time that a "growth stage" advances to the next "growth stage", action and behavior models of the next "growth stage" which are movable to from the current action and behavior model of the current "growth stage" are restricted, and only the transitions between the action and behavior models that have been connected by the arrows shown in FIG. 3 are possible. So, for instance, in the case where the action and behavior model (Child 1) that is "mischievous" action and behavior has been selected in "the child stage", it is not able to transfer to the action and behavior model (Young 3) that is "gentle" action and behavior on "the youth stage".

In this manner, this pet robot is enabled to change its "character" as it grows, in response to the input history of influences and commands from the user and/or the action history of itself, as if a natural animal gradually formed its character on the basis of the breeding method of the owner and the others.

(1-2) Processing by Controller 10

Then, the processing of the controller 10 related to action generation of such a pet robot 1 is explained.

Figure 4:
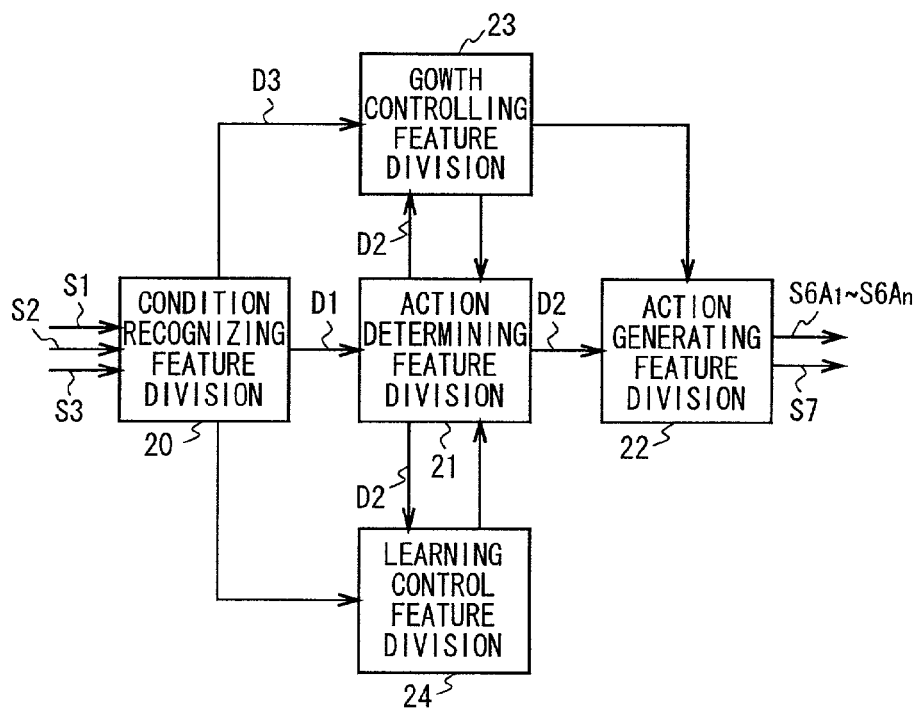
FIG. 4 is a block diagram used for explaining the processing by the controller.

As shown in FIG. 4, the contents of processing by the controller 10 related to action generation of the pet robot 1 can be divided, with respect to its function, into a condition recognizing feature division 20 for recognizing the condition, an action determining feature division 21 for determining the next action on the basis of the result of the recognition by the condition recognizing feature division 20, an action generating feature division 22 for causing the pet robot 1 to actually execute the action on the basis of the result of the determination by the action determining feature division 21, a growth controlling feature division 23 for controlling "the growth stage" of this pet robot 1, and a learning control feature division 24.

In this case, on the basis of the audio signal S1, the image signal S2 and the pressure detection signal S3 that are given from the microphone 15, the CCD camera 16 and the touch sensor 17, the condition recognizing feature division 20 detects and recognizes the particular condition, the particular influence from the user and the command from the user, and then notifies the result of the recognition to the action determining feature division 21 as a condition recognition information D1.

To be more concrete, the condition recognizing feature division 20 always monitors the audio signal S1 that is given from the microphone 15, and, when detecting a spectrum having the same musical scales as those of the command sounds which are outputted from the sound commander in response to the commands such as "Walk", "Lie down" and "Chase the ball !" as the spectrum of the audio signal S1, it recognizes that the command has been given, and then notifies the result of the recognition to the action determining feature division 21.

Besides, the condition recognizing feature division 20 always monitors the image signal S2 that is given from the CCD camera 16, and, when detecting, for instance, "a red and round thing" and/or "a plane surface that is perpendicular to the earth and having a the predetermined height or more", it recognizes that "there is a ball", "there is a wall", and then notifies the result of the recognition to the action determining feature division 21.

In addition, the condition recognizing feature division 20 always monitors the pressure detection signal S3 that is given from the touch sensor 17, and, on the basis of the pressure detection signal S3, when detecting a pressure of the predetermined threshold value or more for short time (for instance, less than 2 seconds), it recognizes that it has been "slapped (disciplined)", on the other hand, when detecting a pressure of less than the predetermined threshold value for long time (for instance, 2 seconds or more), it recognizes that it has been "rubbed gently (praised)", and then notifies these results of the recognition to the action determining feature division 21.

At the time that the condition recognition information D1 is given from the condition recognizing feature division 20 and/or the time that the fixed time passes after the transition to the current action and the like, the action determining feature division 21 determines the next action such as "stand", "lie down", "walk", on the basis of the control parameter related to "action" of the action and behavior model that has been previously assigned by the growth controlling feature division 23 out of the control parameters related to "action" of the respective action and behavior models that have been stored in the memory 10A.

Figure 5:
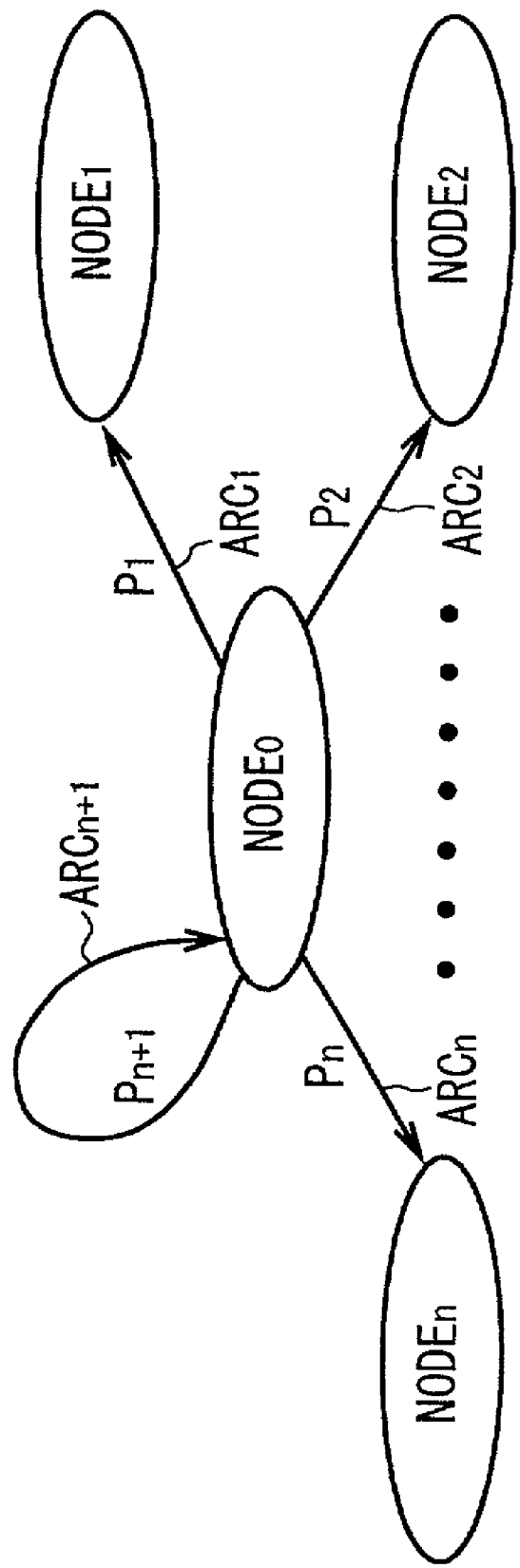
FIG. 5 is a conceptual diagram showing a probability automaton.

To be more concrete, the action determining feature division 21 uses the algorithm that is called probability automaton as the approach for determining the next action, wherein conditions are represented as nodes $NODE_0$, to $NODE_n$, and which of the other nodes $NODE_1$ to $NODE_n$, the condition shall transfer to from one node $NODE_0$, is probabilistically determined, on the basis of the transition probabilities $P_1$ to $P_{n+1}$ that have been set toward the arcs $ARC$ to $ARC_{n+1}$ that connect among the respective nodes $NODE_0$, to $NODE_n$, as shown in FIG. 5.

And, into the memory 10A, the transference conditions ("has been slapped", "has been rubbed gently" and the like) for each node $NODE_1$ to $NODE_n$, the transferable places (nodes $NODE_0$, to $NODE_n$,) and the transition probability $P_1$ to $P_{n+1}$ and the like in this probability automaton are previously stored, for each action and behavior model of each "growth stage", as the control parameters related to "action".

And, on the basis of the control parameters concerning this "action", at the time that the condition recognition information D1 is given from the condition recognizing feature division 20, and/or the time that the fixed time passes after the transition to the current node $NODE_0$, and the like, the action determining feature division 21 determines the next node $NODE_0$ to $NODE_n$, on the basis of the control parameters of the transference conditions and/or the transferable places and the transition probability $P_1$ to $P_{n+1}$ in the node $NODE_0$, of that time in the action and behavior model that has been selected at that time, and notifies the action that has been associated with the arc $ARC_1$ to $ARC_{n+1}$ on the route for that node $NODE_0$ to $NODE_n$ to the action generating feature division 22, the growth controlling feature division 23 and the learning control feature division 24, as an action determination information D2.

The action generating feature division 22 has, in the memory 10A, a wide variety of control parameters concerning "walking condition", "motion" and "sound" for each action and behavior model, in an associating manner with each action and behavior model of the above-mentioned each "growth stage".

And, when the action determination information D2 is given from the action determining feature division 21, the action generating feature division 22 generates a concrete action plan for executing the action determined by the action determining feature division 21, on the basis of the various control parameters of the action and behavior model that has been previously assigned by the growth controlling feature division 23 out of the various control parameters concerning "walking condition", "motion" and "sound" of these action and behavior models that have been stored in the memory 10A. In practice, this action plan is calculated as a numerical value of how much actuators $19A_1$ to $19A_n$ that are necessary for executing the action are to be rotated.

On the basis of this driving plan, the action generating feature division 22 generates control signals $S6A_1$ to $S6A_n$ for the necessary actuators $19A_1$ to $19A_n$ and, on the basis of these control signals $S6A_1$ to $S6A_n$, it drives and controls the corresponding actuators $19A_n$ to $19A_n$, thereby causing the pet robot 1 to execute the action that has been determined by the action determining feature division 21.

On the other hand, at this time, when the condition recognizing feature division 20 recognizes some condition on the basis of the audio signal S1, the image signal S2 and the pressure detection signal S3 that are respectively given from the microphone 15, the CCD camera 16 and the touch sensor 17, it notifies this to the growth controlling feature division 23 as a condition recognition information D3.

Besides, as some condition that is to be notified to the growth controlling feature division 23 from the condition recognizing feature division 20, there are, for instance, such inputs that are given via the touch sensor 17 and does not corresponds to "stroking" or "slapping", in addition to the specific condition that is notified to the action determining feature division 21 as described above.

Figure 6:
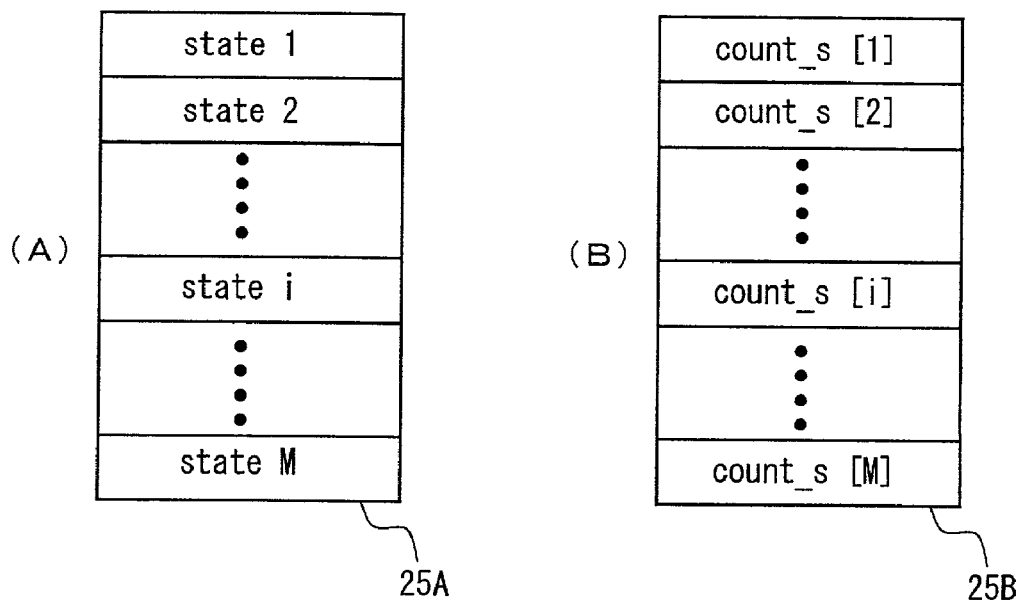
FIG. 6 is a conceptual diagram showing a first growth factors list and a first growth factor counter table.

Besides, as shown in FIG. 6 (A), the growth controlling feature division 23 is having a list (hereinafter, this is referred to as the first growth factors list) 25A of the above-mentioned growth factors that are to be used as the reference factor of the time when "a growth stage" is advanced and a counter table (hereinafter, this is referred to as the first growth factor counter table) 25B shown in FIG. 6 (B) for respectively counting the cumulative frequencies of these growth factors out of the various conditions based on the condition recognition information D3 given from the condition recognizing feature division 20 in this manner, in the memory 10A, as the control parameter concerning "growth".

And, when the condition recognition information D3 is given from the condition recognizing feature division 20, the growth controlling feature division 23 judges whether the condition that is obtained on the basis of the condition recognition information D3 is a growth factor or not, on the basis of the first growth factors list 25A, and, in the case where the condition is a growth factor, increments the corresponding count value (experience value) in the first growth factor counter table 25B by 1.

Figure 7:
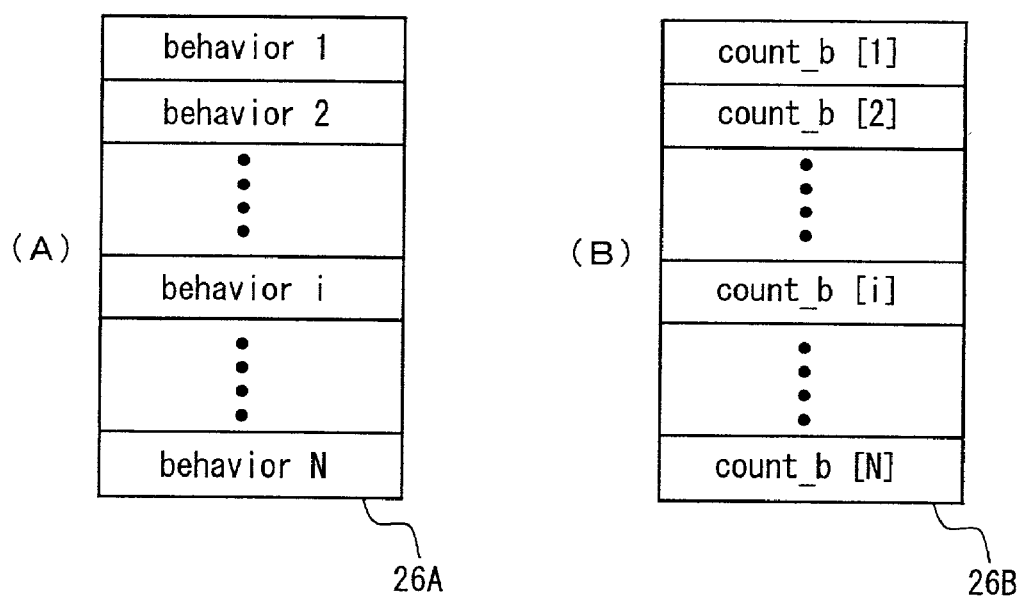
FIG. 7 is a conceptual diagram showing a second growth factors list and a second growth factor counter table.

In addition, as shown in FIG. 7 (A), the growth controlling feature division 23 has a list (hereinafter, this is referred to as the second growth factors list) 26A of the above-mentioned growth factors that are to be used as the reference factor of the time when "a growth stage" is advanced and a counter table (hereinafter, this is referred to as the second growth factor counter table) 26B shown in FIG. 7 (B) for respectively counting the cumulative frequencies of these growth factors out of the actions that are obtained on the basis of the action determination information D2 given from the action determining feature division 21 as described above, in the memory 10A, as the another control parameter concerning "growth".

And, when the action determination information D2 is given from the action determining feature division 21, the growth controlling feature division 23 judges whether the action that is obtained on the basis of the action determination information D2 is a growth factor or not, on the basis of the second growth factors list 26A, and, in the case where the action is a growth factor, increments the corresponding count value (experience value) in the second growth factor counter table 26B by 1.

Besides, at the time that the growth controlling feature division 23 increments the count value in the first or the second growth factor counter table 25B, 26B as described above, it increments the count value of a counter (hereinafter, this is referred to as the total experience value counter) that is used for judging whether "the growth stage" is to be advanced or not and that has been prepared in addition to the first and the second growth factor counter tables 25B, 26B, by 1, and then judges whether the count value of the total experience value counter has reached the count value that has been previously set as the ending condition of the current "growth stage" or not.

And, in the case where the count value of the total experience value counter has reached the count value that has been previously set as the ending condition of the current "growth stage", the growth controlling feature division 23 determines which action and behavior model in the next "growth stage" the action and behavior model is to be transferred to, on the basis of each count value in the first and the second growth factor counter tables 25B, 26B, and then notifies the result of the determination to the action determining feature division 21 and the action generating feature division 22. In this connection, at the initial time, the growth controlling feature division 23 notifies the action determining feature division 21 and the action generating feature division 22 to select the action and behavior model of "the baby stage".

As a result of this, on the basis of this notification received from the growth controlling feature division 23, the action determining feature division 21 selects the control parameter concerning "action" of the assigned action and behavior model, and, after this time, determines the current action of the pet robot 1 by the use of this control parameter, as described above.

Besides, on the basis of the notification received from the growth controlling feature division 23, the action generating feature division 22 selects the various control parameters concerning "walking condition", "motion" and "sound" of the assigned action and behavior model, and, after this time, drives and controls the respective actuators $19A_1$ to $19A_n$ and/or the sound output by the use of these various control parameters.

In this manner, the growth controlling feature division 23 controls "growth" of this pet robot 1 on the basis of the input history of influences and commands from the user and/or the action history of itself.

On the other hand, when the condition recognizing feature division 20 ascertains the fact of "has been rubbed gently" and/or "has been slapped" on the basis of the pressure detection signal S3 that is given from the touch sensor 17, it notifies this fact to the learning control feature division 24.

At this time, the learning control feature division 24 always recognizes the current and the past actions, on the basis of the action determination information D2 that is given from the action determining feature division 21. And, in the case where such a recognition result that the pet robot 1 "has been rubbed gently" during it is in the middle of developing the action has been given from the condition recognizing feature division 20, the learning control feature division 24 notifies this fact to the action determining feature division 21.

In this way, on the basis of this notification, the action determining feature division 21 decreases the transition probability $P_1$ to $P_{n+1}$ of the arc $ARC_1$ to $ARC_{n+1}$ that has been associated with the action which is being developed at that time out of the control parameters for determining "action" represented with the probability automaton shown in FIG. 5, by the prescribed magnitude; on the other hand, it increases the transition probabilities $P_1$ to $P_{n+1}$ of the other action (arcs $ARC_1$ to $ARC_{n+1}$) that can be developed from the original node $NODE_0$ to $NODE_n$, by a magnitude that corresponds to this decrement.

In the case where such a recognition result that the pet robot 1 "has been rubbed gently" during it is in the midst of developing the action is given from the condition recognizing feature division 20, the learning control feature division 24 notifies this fact to the action determining feature division 21.

In this way, on the basis of this notification, the action determining feature division 21 increases the transition probability $P_1$ to $P_{n+1}$ of the arc $ARC_1$ to $ARC_{n+1}$ that has been associated with the action which is being developed at that time out of the control parameters for determining "action" by the prescribed magnitude; on the other hand, it decreases the transition probabilities $P_1$ to $P_{n+1}$ of the other action (arcs $ARC_1$ to $ARC_{n+1}$) that can be developed from the original node $NODE_0$ to $NODE_n$, by a magnitude that corresponds to this increment.

And, by virtue of controlling like this, at the time of "has been slapped", the transition probability $P_1$ to $P_{n+1}$ of the arc $ARC_1$ to $ARC_{n+1}$ that corresponds to the action decreases and the action, therefore, becomes hard to be developed, and, at the time of "has been rubbed gently", the transition probability $P_1$ to $P_{n+1}$ of the arc $ARC_1$ to $ARC_{n+1}$ that corresponds to the action increases and the action, therefore, becomes easy to be developed; so, it is able to change the action, as if a natural animal gradually learned and changed its action on the basis of the owner's training.

In this manner, the controller 10 is capable of causing the pet robot 1 to autonomously act while causing it to "growing" and/or "learning", on the basis of the input history of influences and commands from the user and/or the action history of itself.

(2) Configuration of Pet Robot Diagnostic System 30 of the Embodiment (2-1) Configuration of Pet Robot Diagnosing System 30

A network system (hereinafter, this is referred to as a pet robot diagnostic system) 30 that is adapted to perform diagnosis of "character" and "problem" of such a pet robot 1 is shown in FIG. 5.

Such a pet robot diagnostic system 30 is formed by connecting personal terminals 31A to 31C to an Internet provider 35 with a satellite communication line 32, a cable television line 33, a telephone line 34 or the like, connecting the internet provider 35 to a server 38 that has been provided by a diagnosis trader 37 on the Internet 36, and directly connecting a personal terminal 31D to the server 38 on a public communication network 39.

In this case, each personal terminal 31A to 31D is a normal personal computer that is placed in an ordinary house or the like, and it is adapted to communicate with the server 38 so as to send and receive the required data between the server 38 and itself, and/or adapted to communicate with the controller 10 of the pet robot 1 that has been connected with it via a connector, not shown, placed on the body unit 2 of the pet robot 1 so as to read the required data out of the memory 10A.

Besides, the server 38 is a Web server with which the diagnosis trader 38 performs, as described later, the diagnosis of "character" and/or "problem" and various processing concerning "counseling" of the pet robot 1, and is adapted to send the screen data of the various screens mentioned below and/or the required image data toward a personal terminal 31A to 31D that has accessed it on the Internet 36 or the public communication network 39, so as to cause the display unit of the corresponding personal terminal 31A to 31D to display the screen and/or the image based on these screen data and/or image data.

Figure 9:
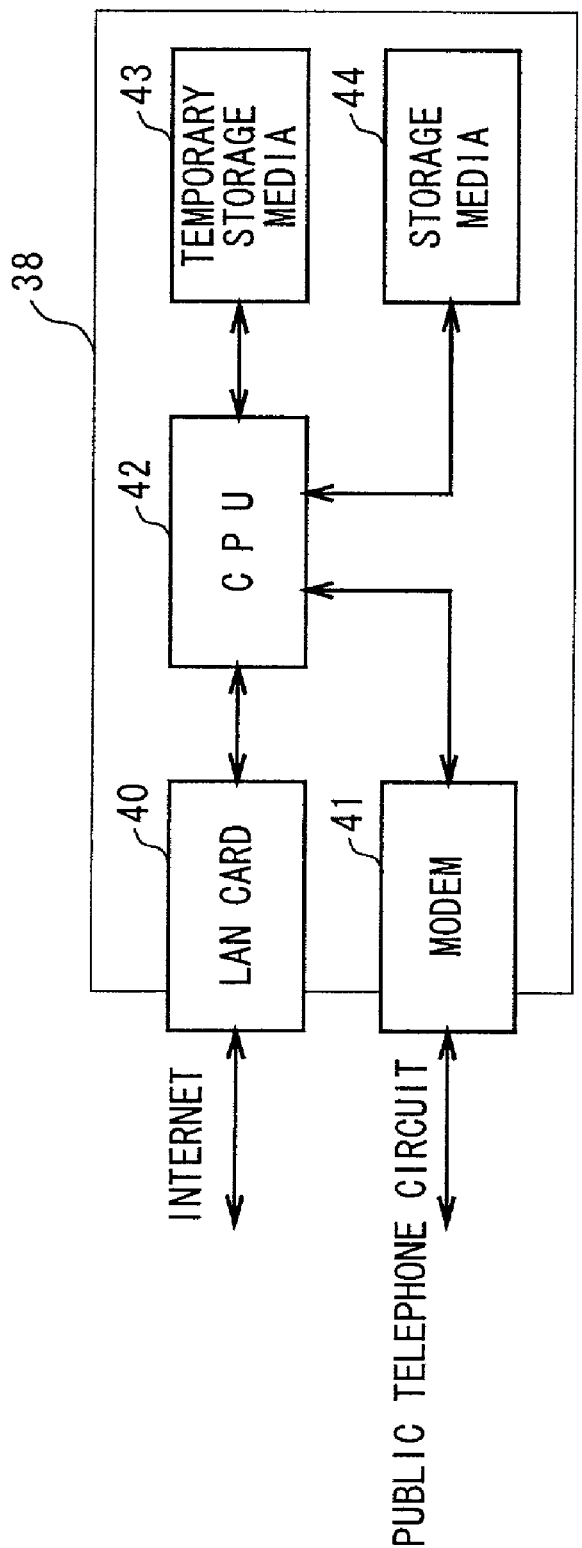
FIG. 9 is a block diagram showing a schematic configuration of the server.

A configuration of this server 38 is shown in FIG. 9. As can be seen from this FIG. 9, the server 38 is comprised of a LAN (Local Area Network) card 40 including an interface circuit for use on the Internet, a modem 41 that serves as an interface circuit for use on the public communication network, a CPU 42 that governs controlling of the entire server 38, a temporary storage media 43 such as a semiconductor memory that serves as a work memory of the CPU 42, and a storage media 44 such as a hard disk drive for storing the various programs and/or the data with which the server 38 executes the processing, described later, and for storing the required data and the like.

And, the server 38 takes data and/or commands that are supplied from a personal terminal 31A to 31D which accessed to it on the Internet 36 or the public communication network 39 in the CPU 42 via the LAN card 40 or the modem 41, and, on the basis of the data and/or command and the control information that is stored in the storage media 44, executes the predetermined processing.

And, the CPU 42 is adapted to send, for instance, the screen data of the various screens mentioned below and/or the other data, programs, commands and the like to the corresponding personal terminal 31A to 31D via the LAN card 40 or the modem 41, on the basis of the result of the processing.

(2-2) Character Diagnostic Procedure and Problem Diagnostic Procedure

Figure 10:
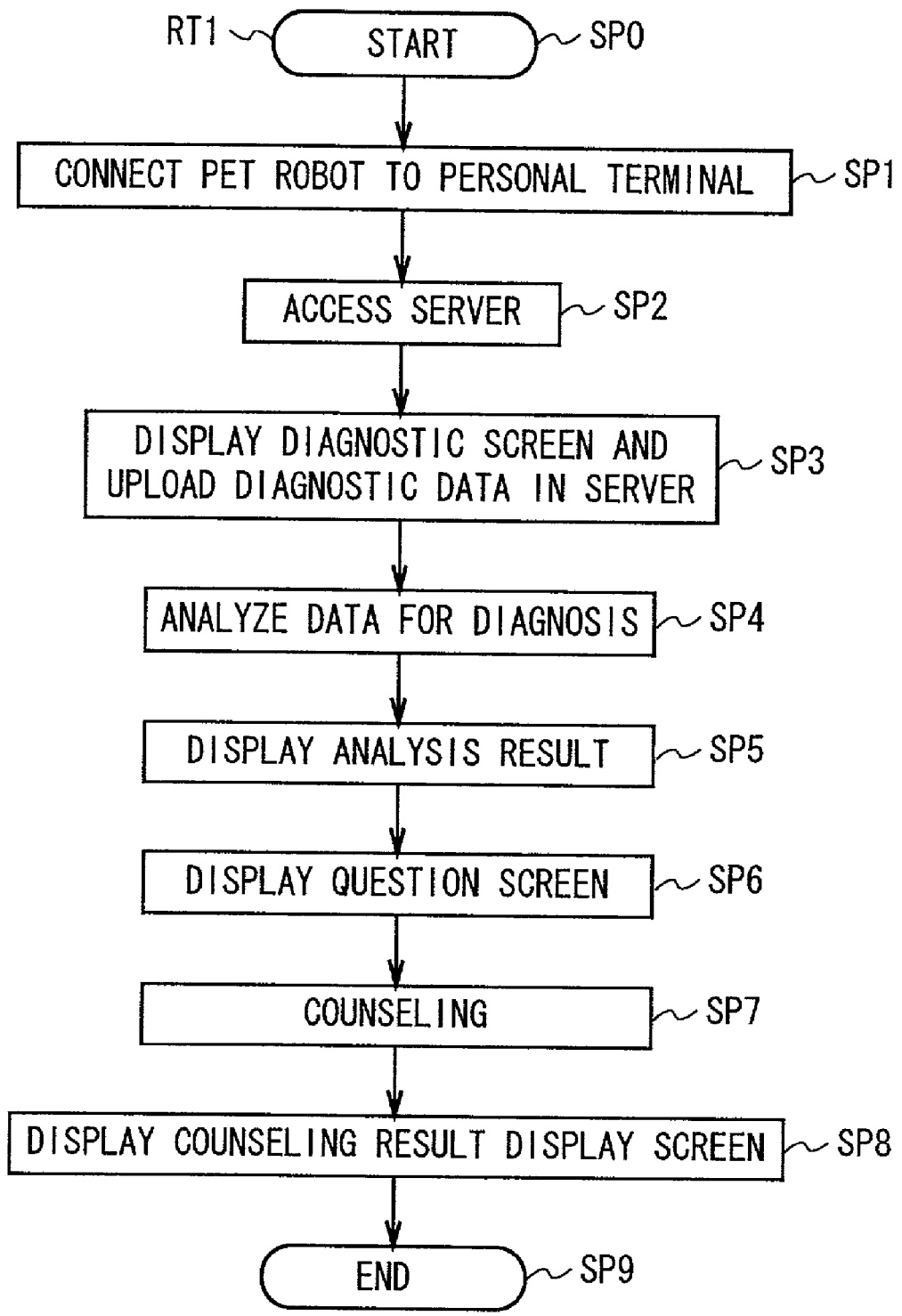
FIG. 10 is a flow chart showing a character diagnostic procedure.

Next, the procedure of "character" and "problem" diagnosis of the pet robot 1 that uses this pet robot diagnostic system 30 will be explained. This pet robot diagnostic system 30 is adapted to perform character diagnosis and/or counseling of this pet robot 1 in accordance with the character diagnostic procedure RT1 shown in FIG. 10, and adapted to perform problem diagnosis of it in accordance with the problem diagnostic procedure RT2 shown in FIG. 11.

First, character diagnosis will be explained. A user who wishes that the "character" of his pet robot 1 is diagnosed should connect the pet robot 1 to the personal terminal 31A to 31D via the above-mentioned connector that has been placed in the body unit 2 of the pet robot 1 (step SP1), and then access the server 38 of the diagnosis trader 37 with the personal terminal 31A to 31D and ask it to diagnose the pet robot 1 (step SP2). As a result, a character diagnosis panel 50 shown in FIG. 12 is displayed on the display unit of the personal terminal 31A to 31D.

This character diagnosis panel 50 is a screen for displaying the results of the diagnoses concerning the previously set several terms that represent the internal condition, such as the number of days that has passed since the pet robot 1 has been initially activated (Age), the growth stage (Phase), the type such as "selfish" and "cheerful" (Type), the degree of affection toward the user (Love to Owner), the degree of affection toward items such as a ball and others (Love to Item), and the wisdom relative to the days that has passed since its initial activation (IQ), and, at the initial time, the character arrays of "Connect the pet robot or the built-in storage media with the PC, please." and "Do you start diagnosis ?" are effectively displayed on it, as well as an OK button 51A and a cancel button 51B.

And, when the user click the OK button 51A on the character diagnosis panel 50, the controller 10 (FIG. 2) of the pet robot 1 is controlled by the CPU 42 of the server 38 via the personal terminal 31A to 31D, and the data that is required for diagnosis (hereinafter, this is referred to as the diagnostic data) is read out of the memory 10A of the pet robot 1, and this is up-loaded to the server 38 via the personal terminal 31A to 31D (step SP3).

In this connection, as such diagnostic data, there are all transition probabilities $P_1$ to $P_{n+1}$ concerning all nodes $NODE_0$ to $NODE_n$, in the probability automaton shown in FIG. 5 out of the control parameters related to "action" of the pet robot 1, each count value in the first and the second counter tables 25B, 26B (FIG. 6 (B), FIG. 7 (B)) out of the various control parameters related to "growth", the count value of the above-mentioned total experience value counter out of the various control parameters related to "growth", the species (Baby 1, Child 1, Child 2, Young 1 to Young 3, Adult 1 to Adult 4) of the action and behavior model that is now used and the like.

And, the CPU 42 of the server 38 performs the analysis processing of thus obtained diagnostic data on the basis of a program that is stored in the storage media 44, and diagnoses the "character" of the pet robot 1 on the basis of the result of the analysis processing (step SP4).

For instance, in the case where an action and behavior model of "Young 3" in FIG. 3 is being used as the action and behavior model, the CPU 42 diagnoses that the growth stage is "Young", and, in addition to this, in the case where various action is hardly done due to learning, it diagnoses that the type is "Mild".

Besides, the CPU 42 diagnoses the degree of affection toward the user of the pet robot 1, on the basis of the species of the action and behavior model that is now used, the value of transition probability $P_1$ to $P_{n+1}$ (varies on the basis of learning) of the arc $ARC_0$ to $ARC_{n+1}$ that has been associated with violent action out of the control parameters concerning "action" and the like, and/or diagnoses the degree of affection of the pet robot 1 for various items (Love to Item) on the basis of the value of transition probability $P_1$ to $P_{n+1}$ (varies on the basis of learning) of the arc $ARC_0$ to $ARC_{n+1}$ that has been associated with the action such as "chase the ball", "play with the ball" and the like out of the control parameters concerning "action".

And, the CPU 42 displays the diagnosis result that has been obtained by the analysis processing like this on the corresponding diagnosis result display division 52A to 52E of the character diagnosis panel 50, and, on the other hand, prepares a comment based on the diagnosis result, and displays this comment on a comment display division 53 in the character diagnosis panel 50.

In addition, on the basis of a program that has been stored in the storage media 44 (FIG. 9) together with this, the CPU 42 calculates the score for the "character" of the pet robot 1 on the basis of the diagnostic data, causes a total score display division 54 contained in the character diagnosis panel 50 to display the result of the calculation; on the other hand, it calculates the wisdom of the pet robot 1 relative to the number of days that passes after it was initially activated, on the basis of the diagnostic data, and then displays the result of the calculation on a wisdom display division 55 (step SP5).

Figure 13:
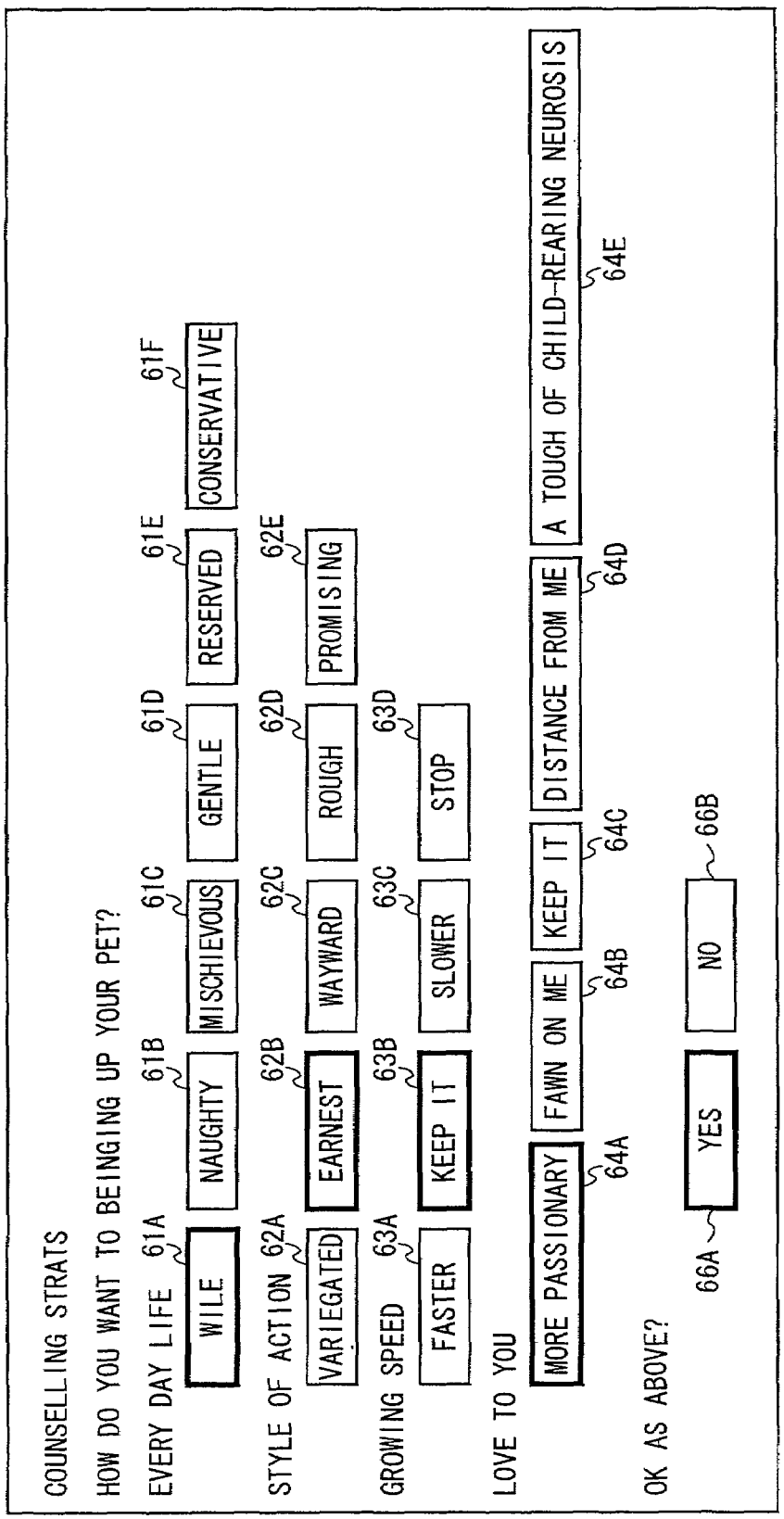
FIG. 13 is a schematic diagram showing a question panel.

On the other hand, when an OK button 56A, 56B of the character diagnosis panel 50 is clicked after that time, the CPU 42 of the server 38 displays a question panel 60 shown in FIG. 13 on the display unit of the user's personal terminal 31A to 31D (step SP6).

This question panel 60 is a screen for asking the user about how he likes to breed the pet robot 1, and, for each of several question terms such as "every-day life", "style of acting", "growing speed" and "love to you", the previously determined several answers are respectively displayed on it, as selection buttons 61A to 61F, 62A to 62E, 63A to 63D, and 64A to 64D in which the characters are displayed. Therefore, for each of these question items, the user is able to input the desired answer by clicking the corresponding selection button 61A to 61F, 62A to 62E, 63A to 63D, 64A to 64D.

And, when the user selects his answer with respect to each question item in this question panel 60 and then clicks the OK button, the CPU 42 of the server 38 performs the predetermined analysis processing on the basis of the user's answers with respect to these question items, the above-mentioned diagnostic data, and the program that has been stored in the storage media, and draws a conclusion of the counseling of how the pet robot 1 is to be bred hereafter (step SP7).

For instance, in the case where the action and behavior model "Young 1" in FIG. 3 is used at present as the action and behavior model, and the value of the transition probability $P_1$ to $P_{n+1}$ of the arc $ARC_0$ to $ARC_{n+1}$ that has been associated with a violent action out of the control parameters concerning "action" becomes larger than the initial value due to learning, and the user's answer for the question item "every-day life" in the question panel 60 has been "reserved", the CPU 42 draws the counseling conclusion of "stroke him more and more, and/or play with him using a ball".

And, when the CPU 42 draws the counseling conclusion by such an analysis processing, it causes the display unit of the personal terminal 31A to 31D to display a counseling result display panel 67 like that which is shown in FIG. 14 as an example and on which the counseling conclusion and the charge are included (step SP8).

Thus, in this pet robot diagnostic system 30, the user is enable to perform the diagnosis and/or the counseling related to "character" of his pet robot 1.

Next, problem diagnosis by the pet robot diagnostic system 30 is explained. In the first place, the servo system of the pet robot 1 will be explained.

Figure 15:
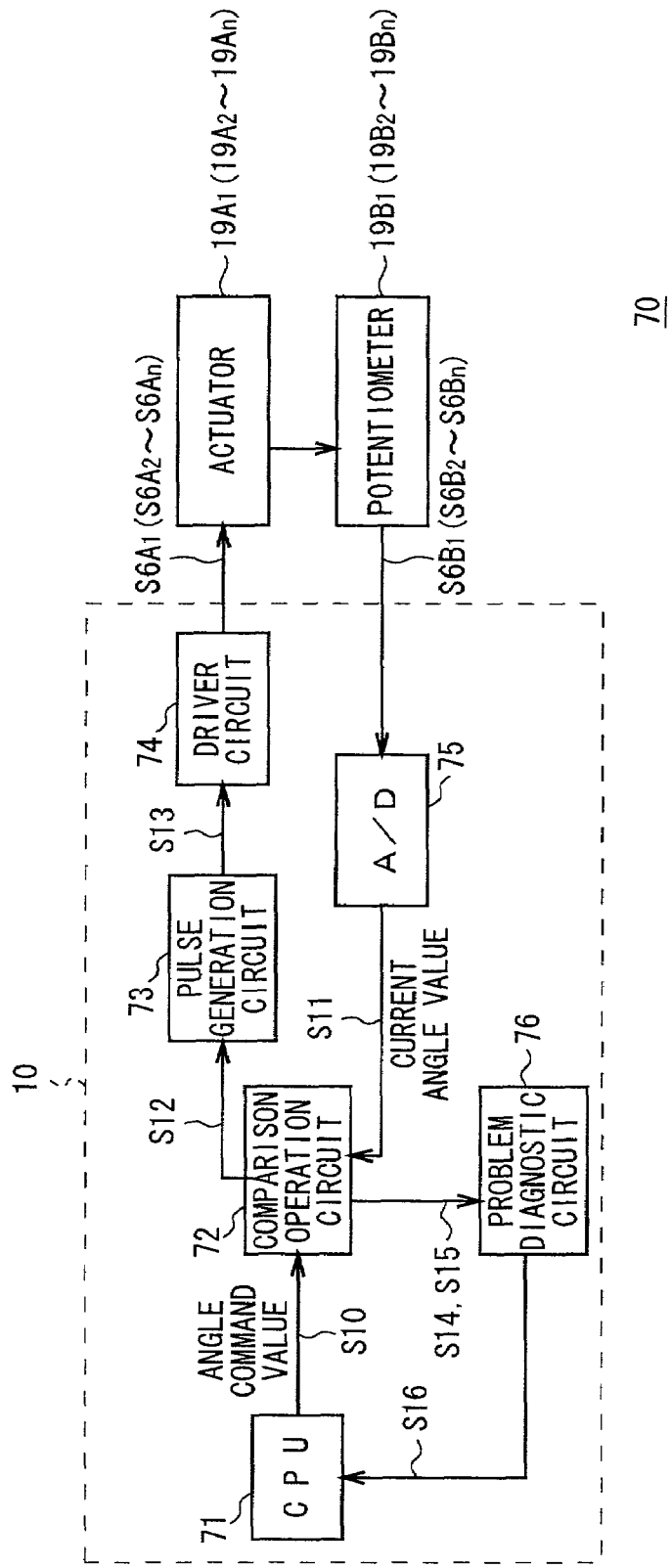
FIG. 15 is a block diagram showing a servo system of the pet robot.

In the pet robot 1, as shown in FIG. 15, as the action generating feature division 22 that has been described above with reference to FIG. 4, a CPU 71, a comparison operation circuit 72, a pulse generation circuit 73, a driver circuit 74, and an analog-to-digital conversion circuit 75 are provided in the controller 10, and, by these, each actuator $19A_1$ to $19A_n$ is driven and controlled.

In this case, at the time of driving the actuators $19A_1$ to $19A_n$, the CPU 71 sends the target rotational angle (angle command value) of the output shaft to the comparison operation circuit 72, as the angle command value signal S10.

Besides, the current angle value of just that moment of the actuator $19A_1$ to $19A_n$ that has been detected by the corresponding potentiometer $19B_1$ to $19B_n$ is digitized by the analog-to-digital conversion circuit 75, and given to the comparison operation circuit 72 as a current angle value signal S11.

The comparison operation circuit 72 then operates the angular difference between the angle command value based on the angle command value signal S10 and the current angle value obtained on the basis of the current angle value signal S11, and sends the result of the operation to the pulse generation circuit 73 as a difference signal S12.

On the basis of the difference signal S12, the pulse generation circuit 73 generates driving pulses for causing the output shaft of the actuator $19A_1$ to $19A_n$ to rotate, and then sends these driving pulses to the driver circuit 74 as a driving pulse signal S13.

The driver circuit 74 generates a driving signal $S6A_1$ to $S6A_n$ having the voltage value corresponding to the supplied driving pulse signal S13, and sends this driving signal to the actuators, so as to drive the corresponding actuator $19A_1$ to $19A_n$.

At this time, the rotational angle of the output shaft of this actuator $19A_1$ to $19A_n$ is detected by a potentiometer $19B_1$ to $19B_n$, and an angle detection signal $S6B_1$ to $S6B_n$ that is the result of the detection is digitized on the analog-to-digital conversion circuit 75, and given to the comparison operation circuit 72 as the above-mentioned current angle value signal S11.

And, in this servo system 70, the same processing is sequentially performed at the fixed period (for instance, 1 [μm]), in a closed loop that is formed of the comparison operation circuit 72, the pulse generation circuit 73, the driver circuit 74, the actuator $19A_1$ to $19A_n$, the potentiometer $19B_1$ to $19B_n$, and the analog-to-digital conversion circuit 75, until the output of the comparison operation circuit 72 becomes "0" (that is, until the current angle value coincides with the angle command value). In this manner, in this servo system 70, the rotational angle of the output shaft of the actuator $19A_1$ to $19A_n$ can be controlled so that it becomes the angle command value.

This servo system 70 is provided with the problem diagnosis circuit 76 for diagnosing problems of the servo system 70. And, at the time that a new angle command value is given to the comparison operation circuit 72 from the CPU 71 as the angle command value signal S10, and also the time that the current angle value of the actuator $19A_1$ to $19A_n$ coincides with the angle command value, a start signal S14 and an end signal S15 are respectively given to this problem diagnosis circuit 76 from the comparison operation circuit 72.

At here, in the closed loop of this servo system 70, if there is breakdown in any of the comparison operation circuit 72, the pulse generation circuit 73, the driver circuit 74, the actuator $19A_1$ to $19A_n$, the potentiometer $19B_1$ to $19B_n$, and the analog-to-digital conversion circuit 75, or there is disconnection in any position, then the servo system 70 do not function correctly, and the output of the comparison operation circuit 72 is always not "0".

So, the problem diagnosis circuit 76 is adapted to start counting of time at the time that the start signal S14 is given to it, and determine that there is not any problem if the end signal S15 is given to it within the fixed time duration, and, on the other hand, determine that there is some problems if the end signal S15 is not given to it within the fixed time duration, and send the result of the judgement to the CPU 71 as a problem diagnosis signal S16. By this, in this servo system 70, the CPU 71 is enabled to easily recognize whether there is some problem or not, on the basis of this problem diagnosis signal S16.

Figure 8:
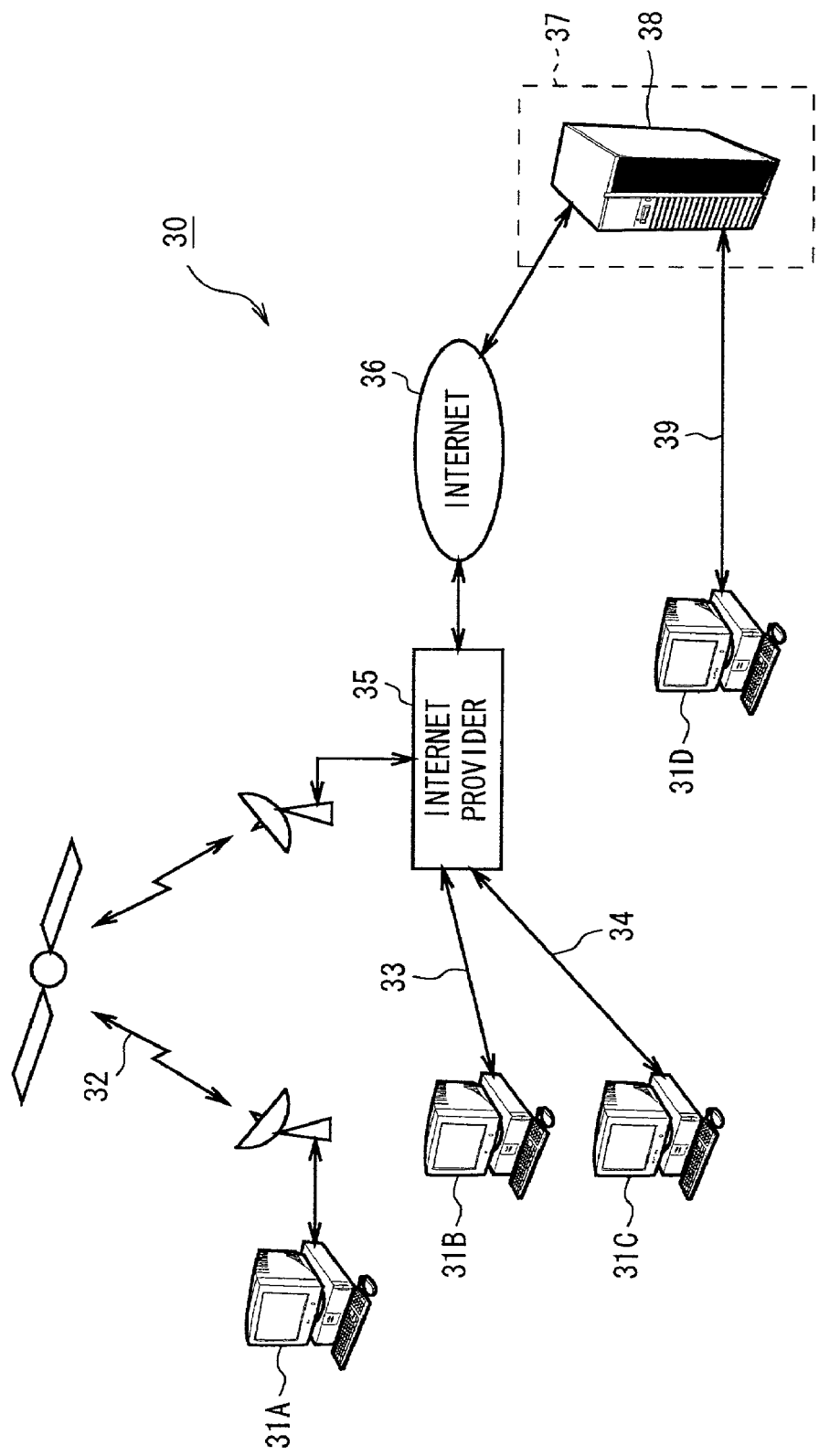
FIG. 8 is a block diagram showing a configuration of the pet robot diagnostic system according to the embodiment.
Figure 11:
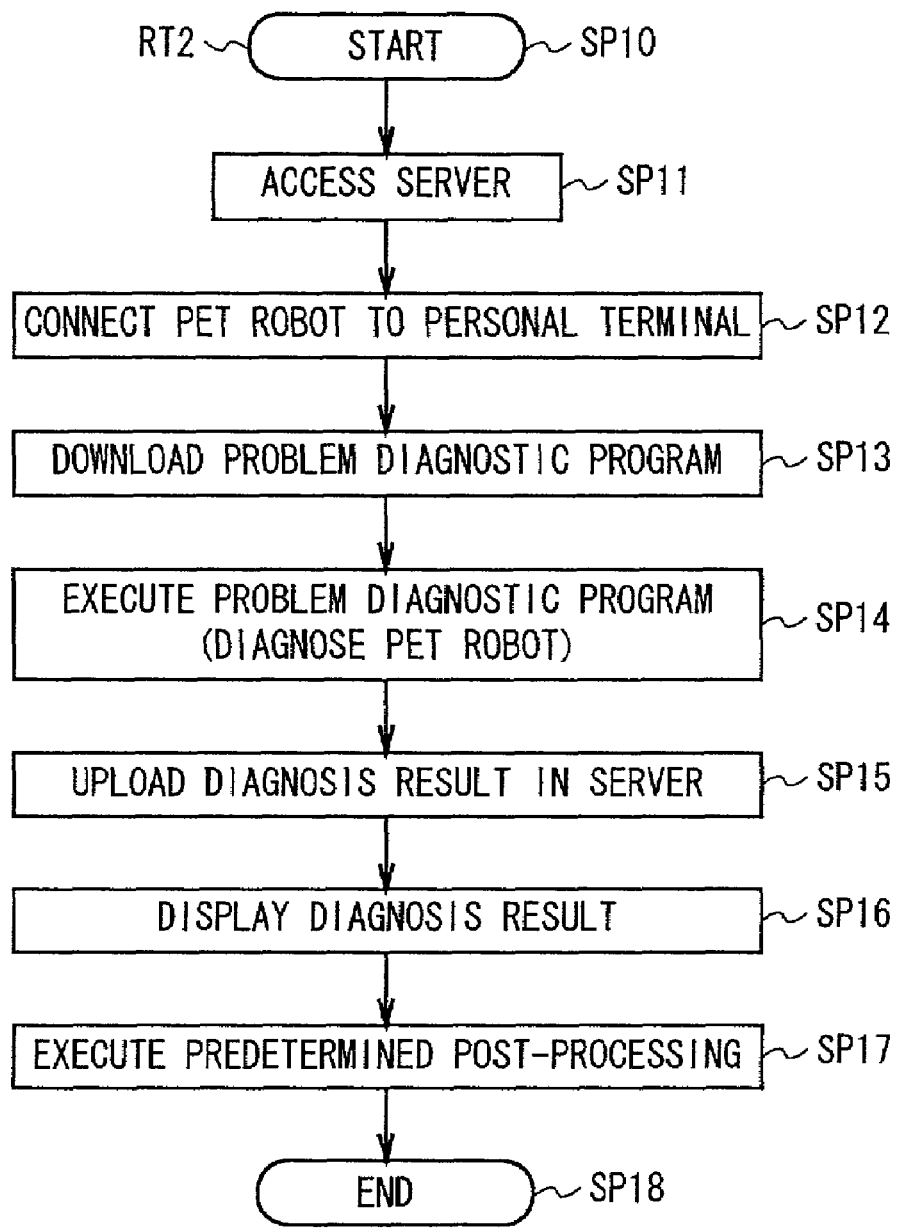
FIG. 11 is a flow chart showing a problem diagnostic procedure.

And, the pet robot diagnostic system 30 shown in FIG. 8 is adapted to diagnose whether there is some problems or not in the pet robot 1, on the basis of the problem diagnostic procedure RT2 shown in FIG. 11, utilizing the self-problem-detecting function in the servo system 70 of such a pet robot 1.

Figure 16:
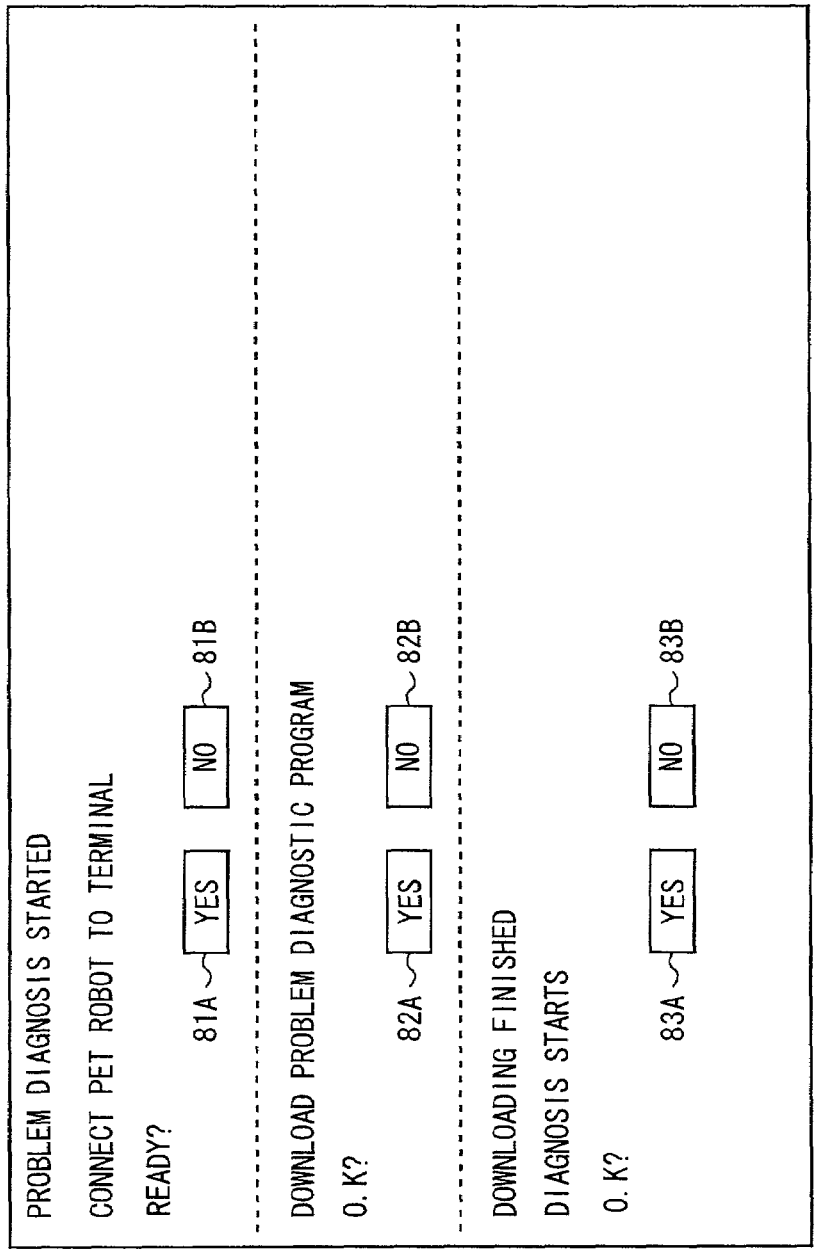
FIG. 16 is a schematic diagram showing a problem diagnostic preparation panel.

In practice, in this pet robot diagnostic system 30, a user who wishes problem diagnosis of his pet robot 1 accesses the server 38 using the personal terminal 31A to 31D, and asks the server 38 to diagnose problems in the pet robot 1 (step SP10). As a result of this, a problem diagnosis preparation panel 80 shown in FIG. 16 is displayed on the display unit of the personal terminal 31A to 31D.

This problem diagnosis preparation panel 80 is a screen for informing the user of the preparation procedure of the problem diagnosis of the pet robot 1, and, at the initial time, the characters of "Problem diagnosis is now started.", "Connect your pet robot to the terminal, please.", and "Ready to diagnose ?" are effectively displayed on it, as well as the first OK button 81A and the first cancel button 81B.

And, when the user clicks the first OK button 81A after he connects the personal terminal 31A to 31D with his pet robot 1 in the same way as the above-mentioned character diagnosis, the characters of "The problem diagnosis program is downloaded." and "Ready ?" are effectively displayed, as well as the second OK button 82A and the second cancel button 82B.

Besides, according to this problem diagnosis preparation panel 80, when the user clicks the second OK button 82A, a program for performing problem diagnosis (hereinafter, this is referred to as the problem diagnosis program) is transferred to the personal terminal 31A to 31D from the server 38, and the problem diagnosis program is stored (downloaded) in the hard-disk in the personal terminal 31A to 31D.

Besides, when downloading of this problem diagnosis program is finished, the characters of "Downloading was finished.""The diagnosis is started." and "Ready ?" are effectively displayed on the problem diagnosis preparation panel 80, as well as the third OK button 83A and the third cancel button 83B.

And, when the user clicks the third OK button 83A, the problem diagnosis of the pet robot 1 by the personal terminal 31A to 31D is performed, on the basis of the problem diagnosis program that has been downloaded into the personal terminal 31A to 31D.

In practice, as such a problem diagnosis, the personal terminal 31A to 31D controls the controller 10 of the pet robot 1 so as to cause it to drive the predetermined one actuator $19A_1$ first. And, at this time, the result of whether there is any problem or not based on the problem diagnosis signal S16 outputted from the problem diagnosis circuit 76 that has been described above with reference to FIG. 15 is notified to the personal terminal 31A to 31D from the CPU 71 included in the controller 10 of the pet robot 1.

In this way, the personal terminal 31A to 31D judges whether there is any problem in the servo system 70 related to the actuator 19A1 or not, on the basis of this notification. Besides, in the same way as this, the personal terminal 31A to 31D controls the controller 10 of the pet robot 1, and, with respect to all actuators 19A1 to 19An, judges whether there is any problem in their corresponding servo system 70 or not.

And, when the personal terminal 31A to 31D finishes inspection of whether any problem exists or not with respect to the servo systems 70 of all actuators 19A1 to 19An in this way, it sends the result of the inspection to the server 38.

Figure 17:
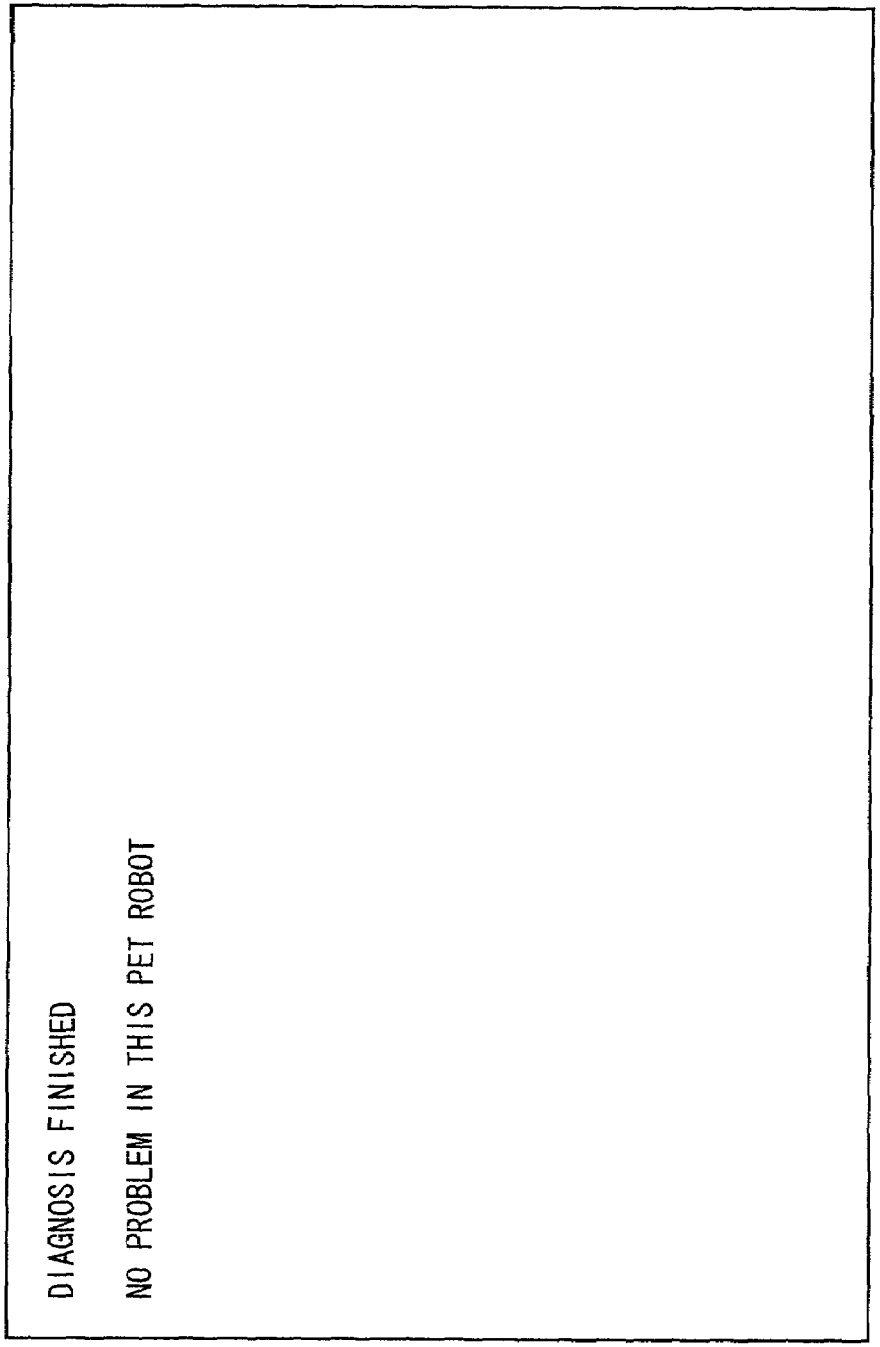
FIG. 17 is a schematic diagram showing a first problem diagnosis result display panel.

And, the CPU 42 of the server 38 analyzes the inspection result that is transferred from this personal terminal 31A to 31D, and diagnoses whether there is some problem in the pet robot 1 or not, on the basis of the analytical result. And, when the CPU 42 has diagnosed as any problem do not exist, it causes the display unit of the personal terminal 31A to 31D to display the first problem diagnosis result display panel 84 that includes, for instance, "The diagnosis was finished.", "There is not any problem in this pet robot." as shown in FIG. 17.

Figure 18:
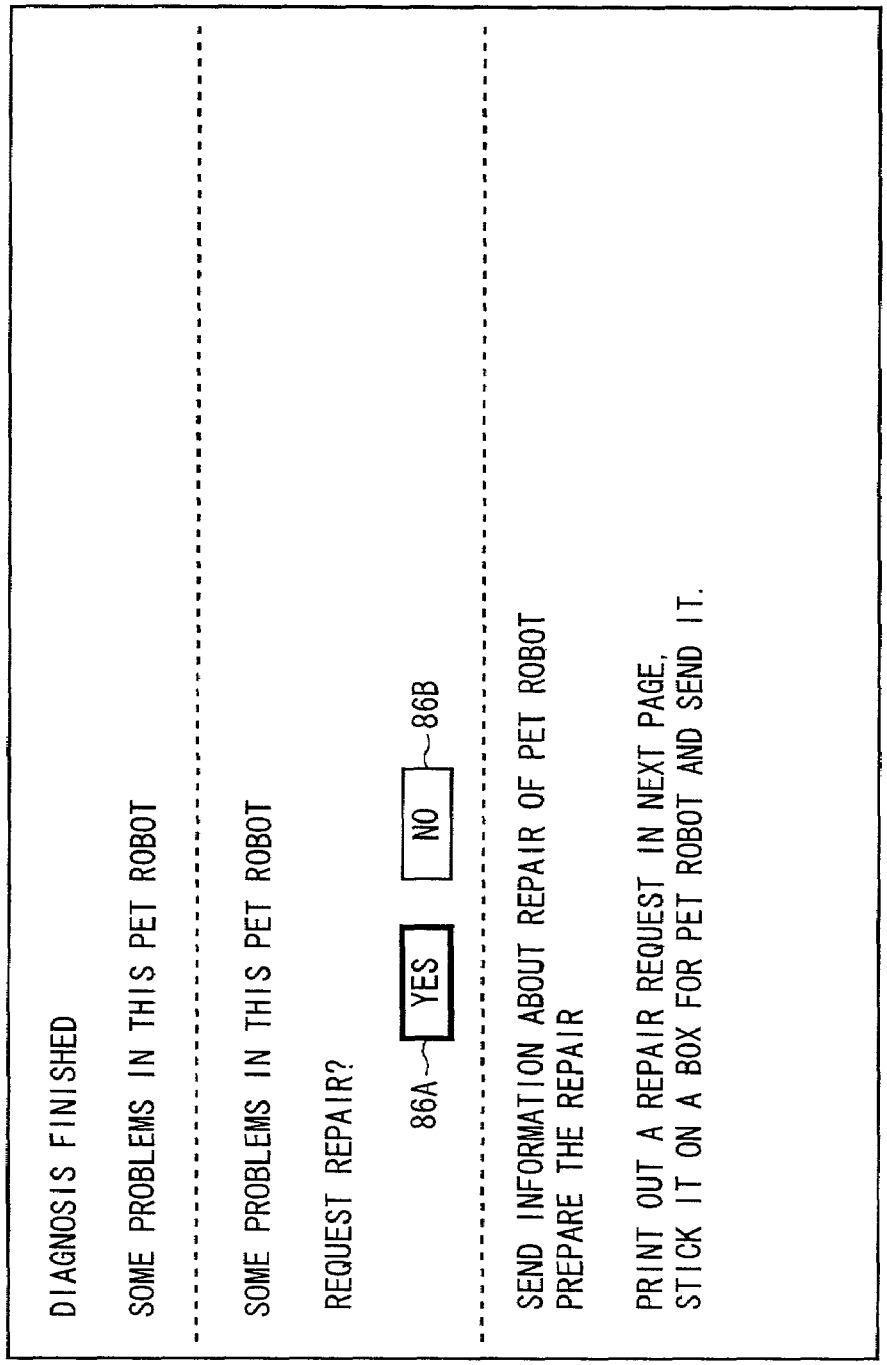
FIG. 18 is a schematic diagram showing a second problem diagnosis result display panel.

Contrarily, when the CPU 42 diagnoses as some problem exists, it causes the display unit of the personal terminal 31A to 31D to display the second problem diagnosis result display panel 85 shown in FIG. 18.

In this case, at the initial time, the characters of "The diagnosis was finished.", "Some problem was found in this pet robot.", and "Do you request the repair ?" are effectively displayed on this second problem diagnosis result display panel 85, as well as an OK button 86A and a cancel button 86B.

Besides, when the OK button 86A of the second problem diagnosis result display panel 85 is clicked, the CPU 42 sends data such as the problem position data that has been obtained as the result of the problem diagnosis and the serial number data of the pet robot 1 that has been read out of the memory 10A of the pet robot 1 to a service center and the like, in the meantime, it displays the characters of "The detailed repair data of the pet robot was transmitted.", "The preparations will be made for the repair." and "Print out a repair request of the next page, paste on the carton box of the pet robot, and route to me, please." on the second problem diagnosis result display panel 85, and, on the other hand, it displays a destination display panel 87 shown in FIG. 19 on the next page.

In this case, on this destination display panel 87, the address and the name of the consignee (the destination) of the pet robot 1, the address and the name (that which has been previously registered by the user) of the consignor, the date of the diagnosis, the receipt number of the diagnosis, the serial number and the problem position of the pet robot 1 and the like of the time when the repair is asked are written.

In this way, the user is able to ask the repair of the pet robot 1, by printing out this destination display panel 87, pasting this on the carton box that has cased the pet robot 1 and routing.

In this manner, in this pet robot diagnostic system 30, the user is enabled to inspect whether there is some problem in his pet robot 1 or not, and to ask its repair with ease when some problem is detected.

(3) Operation and Effects of the Embodiment

In this pet robot diagnostic system 30 having the above configuration, when the pet robot 1 is connected to the personal terminal 31A to 31D, and accesses the server 38 of the diagnosis trader 37 to ask for the character diagnosis using the personal terminal 31A to 31D, the various control parameters related to "action" and/or "growth" of the pet robot 1 are uploaded to the server 38 as the diagnostic data, and, on the basis of the diagnostic data, the condition of the pet robot 1 is diagnosed by the server 38, and the obtained result of the diagnosis is displayed on the display unit of the personal terminal 31A to 31D.

Besides, in this pet robot diagnostic system 30, by sending the answers to the questions of how he likes to breed this pet robot 1 after this time, counseling is made by the server 38 on the basis of the answers to the questions and the diagnostic data, and the result of the counseling is displayed on the display unit of the personal terminal 31A to 31D.

Furthermore, in this pet robot diagnostic system 30, when the pet robot 1 is connected to the personal terminal 31A to 31D, and accesses to the server 38 to ask for the problem diagnosis, the problem diagnosis program is transferred to the personal terminal 31A to 31D from the server 38, and problem diagnosis is performed on the basis of the problem diagnosis program, and then the obtained diagnosis result is displayed on the display unit of the personal terminal 31A to 31D.

Therefore, according to this pet robot diagnostic system 30, the user is able to easily perform detection of the current condition of "action" and/or "growth" and/or some problems and the like of his pet robot 1.

According to the above configuration, character diagnosis and/or problem diagnosis of the pet robot 1 can be performed under the control of the server 38, and so the user is able to easily check the condition of the character, the problem and the like of his pet robot 1; in this way, it is able to realize a pet robot diagnostic system that can make handling of a pet robot 1 easy.

(4) Other Embodiments

Note that, in the above embodiment, such a case has been described that the present invention has been applied to the pet robot diagnostic system 30 for diagnosing the pet robot 1 having a configuration shown in FIG. 1; however, the present invention can be applied not merely to this case, but also to the other wide variety of diagnostic devices for diagnosing a condition of, for instance, a virtual living thing other than a pet robot 1 (some problem of the hardware that retains the virtual living thing, the states of the various parameters, whether there is some damages in the program or not, and others) and/or for diagnosing a condition of a stuffed toy that is an entity in three-dimensional space of the virtual living thing.

Besides, in the above embodiment, such a case has been described that the server 38 performs the diagnosis processing of the character and/or the problem of the pet robot 1; however, we do not intend to limit the present invention to such. Alternatively, the program that is required to perform these processing may be given to a personal terminal 31A to 31D, so as to enable the personal terminal 31A to 31D to perform these processing.

In addition, in the above embodiment, such a case has been described that the target of the problem diagnosis in the pet robot 1 is the servo system 70 (FIG. 15); however, we do not intend to limit the present invention to such. Problems in the other hardware may be also diagnosed. Furthermore, some damage of the software such as the control program and/or the various control data of the pet robot 1 and the like may be also treated as the target of the problem diagnosis.

In addition, in the above embodiment, such a case has been described that the pet robot 1 is connected to the personal terminal 31A to 31D with a cable or the like, and the data that is needed for the character diagnosis is captured; however, we do not intend to limit the present invention to such. For instance, a part or the whole of the software such as the control program and/or the various control data in the pet robot 1 may be stored in a removable recording media such as a memory card, and this recording media may be taken out of the pet robot 1 and loaded into the personal terminal 31A to 31D at the time that the character diagnosis is performed.

In addition, in the above embodiment, such a case has been described that the memory 10A has been utilized as the recording media for storing the software such as the control program and/or the various control parameters of the pet robot 1; however, we do not intend to limit the present invention to such, and the other wide variety of recording media may be utilized.

In addition, in the above embodiment, such a case has been described that the analyzing means for analyzing the diagnostic data that has been read from the memory 10A of the pet robot 1 and/or the problem diagnosis signal S16 that is outputted from the problem diagnosis circuit 76 of the pet robot 1 (FIG. 15), the diagnosing means for diagnosing the condition (the internal condition such as the character and the external condition such as some problems) of the pet robot 1 on the basis of the result of the analysis, and the counseling processing means for performing the counseling processing on the basis of the analysis result obtained by the analyzing means are realized by the CPU 42 of the server 30; however, we do not intend to limit the present invention to such. Alternatively, these analyzing means, diagnosing means and counseling means may be separately provided.

In addition, in the above embodiment, such a case has been described that the means for taking the data that is needed for diagnosis of the character or the problem, out of the pet robot 1 and the displaying means for visually displaying the diagnosis result that is given from the server 38 are realized by the identical personal terminal 31A to 31D; however, we do not intend to limit the present invention to such, and these may be separately provided.

In addition, in the above embodiment, such a case has been described that the personal terminal 31A to 31D is connected to the server 38 on the Internet 36 or the public communication line (network) 39; however, we do not intend to limit the present invention to such, and they may be connected on a network such as LAN other than these Internet 36 or the public communication line (network) 39.

INDUSTRIAL APPLICABILITY

The present invention relates to a diagnostic system, a diagnostic device, and a diagnostic method, and for instance, can be utilized in a diagnostic system of diagnosing a pet robot on a network.

The invention claimed is:

1. A diagnostic system, comprising:
first communication means provided on a user side of a virtual living thing which exists as software and is programmed so as to act or behave are programmed;
second communication means provided on a service providing side which provides a service to diagnose the condition of said software of said virtual living thing or the condition of hardware keeping said virtual living thing; and
a communication line for connecting said first and second communication means, and wherein:

said first communication means transmits, to said second communication means through said communication line, data for diagnosis necessary for diagnosing the condition of said software of said virtual living thing or the condition of said hardware keeping said virtual living thing; and
said second communication means analyzes said data for diagnosis, which is given from said first communication means, and diagnosis said condition of said software of said virtual living thing or said condition of said hardware keeping said virtual living thing, on the basis of the analysis result.

2. The diagnostic system according to claim 1, wherein:
said second communication means transmits said diagnosis result to said first communication means through said communication line; and
said first communication means comprises display means to visually display said diagnosis result, which is given from said second communication means.

3. The diagnostic system according to claim 1, wherein:
said virtual living thing has at least one of a transition probability model which is obtained by modeling transition of generating actions and behaviors of the virtual living thing, a feeling model which is obtained by modeling change of feeling of the virtual living thing, and a growth model which is obtained by modeling the growth of the virtual living thing, and on the basis of the external condition, the internal condition and/or the operation from outside, the transition probabilities corresponding to said transition probability model, parameter values corresponding to said feeling model, and/or the current growth step of the virtual living thing in said growth model are changed as necessity;
said first communication means transmits to said second communication means, each of said transition probabilities of said transition probability model, each of said parameter values of said feeling model, and/or a growth step value expressing the current growth step in said growth model, as said data for diagnosis for diagnosing said condition of said software of said virtual living thing; and said communication means analyzes each of said transition probabilities of said transition probability model, each of said parameter values of said feeling model, and/or said growth step value, and diagnoses the character of said virtual living thing as said condition of said virtual living thing on the basis of the analysis result.

4. The diagnostic system according to claim 3, wherein said second communication means:
transmits question data to said first communication means, to ask said user of said virtual living thing how to breed the virtual living thing, after diagnosing said character of the virtual living thing;
performs predetermined counseling processing on the basis of said user's answers to the questions, which are transmitted from said first communication means, and said data for diagnosis of the virtual living thing; and
transmits to said first communication means, the counseling result indicating how to breed the virtual living thing, which is obtained through the counseling processing.

5. The diagnostic system according to claim 1, wherein:
said second communication means transmits a problem diagnostic program which is a computer program to diagnose the condition of said hardware keeping said virtual living thing;

said first continuation means examine if said hardware keeping said virtual living thing has any problems, and transmits the examination result to said second communication means; and said second communication means analyzes the examination result, which is transmitted from said first communication means, and diagnoses the presence or absence of problem as said condition of said hardware keeping the virtual living thing.

6. The diagnostic system according to claim 5, wherein said second communication means informs a predetermined service center of data related to a problem and/or necessary data including the serial number of said virtual living thing which is obtained via said first communication means, in the case where said hardware keeping the virtual living thing has the problem.

7. The diagnostic system according to claim 5, wherein said second communication means transmits a destination of a repair request to said first communication means when said hardware keeping said virtual living thing has a problem.

8. A diagnostic method, comprising:
a first step of transmitting data for diagnosis necessary for diagnosing the condition of software of a virtual living thing or the condition of hardware keeping the virtual living thing, from a first communication means provided on a user side of the virtual living thing which exists as software and is programmed so as to act or behave, to a second communication means provided on a service providing side which provides a service to diagnoses the condition of said software of the virtual living thing or the condition of the hardware keeping the virtual living thing; and a second step of, using said second communication means, analyzing said data for diagnosis, which is given from said first communication means, and diagnosing said condition of said software of said virtual living thing or said condition of said hardware keeping said virtual living thing, on the basis of the analysis result.

9. The diagnostic method according to claim 8, comprising a third step of transmitting said diagnosis result to said first communication means through said communication line from said second communication means, and visually displaying said diagnosis result, which is obtained from said second communication means, with said first communication means.

10. The diagnostic method according to claim 8, wherein:
said virtual living thing has at least one of a transition probability model which is obtained by modeling transition of generating actions and behaviors of the virtual living thing, a feeling model which is obtained by modeling change of feeling of the virtual living thing, and a growth model which is obtained by modeling the growth of the virtual living thing, and on the basis of the external condition, the internal condition and/or the operation from outside, the transition probabilities corresponding to said transition probability model, parameter values corresponding to said feeling model, and/or the current growth step of the virtual living thing in said growth model are changed as necessity;

said first step is to transmit each of said transition probabilities of said transition probability model, each of said parameter values of said feeling model, and/or a growth step value representing the current growth step in said growth model, to said communication means as said data for diagnosis for diagnosing said condition of said software of said virtual living thing; and said second step is to analyze each of said transition probabilities of said transition probability model, each of said parameter values of said feeling model, and/or said growth step value and to diagnoses the character of said virtual living thing as said condition of said virtual living thing on the basis of the analysis result.

11. The diagnostic system according to claim 10, wherein said second step comprises:
a question data transmitting step of transmitting question data to said first communication means, to ask said user of said virtual living thing how to breed the virtual living thing, after diagnosing said character of the virtual living thing;

a counseling processing step of performing predetermined counseling processing on the basis of said users answers to the questions, which are transmitted from said first communication means, and said data for diagnosis of the virtual living thing; and a counseling result transmitting step of transmitting to said first communication means, the counseling result indicating how to breed the virtual living thing, which is obtained through the counseling processing.

12. The diagnostic method according to claim 10, wherein said first step comprises:
a problem diagnostic program transmitting step of transmitting a problem diagnostic program which is a computer program to diagnose the condition of said hardware keeping said virtual living thing;

an examining step of examining if said hardware keeping said virtual living thing has any problems, on the basis of the problem diagnostic program; and an examination result transmitting step of transmitting the examination result to said second communication means; and said second step is to analyze the examination result, which is transmitted from said first communication means, and to diagnose the presence or absence of problem as said condition of said hardware keeping the virtual living thing.

13. The diagnostic method according to claim 12, wherein said second step comprises an informing step of informing a predetermined service center of data related to a problem and/or necessary data including the serial number of said virtual living thing which is obtained via said first communication means, in the case where said hardware keeping the virtual living thing has the problem.

14. The diagnostic method according to claim 12, wherein said second step comprises a repair-request-destination informing step of transmitting a destination of a repair request to said first communication means when said hardware keeping said virtual living thing has a problem.

15. The diagnostic system according to claim 1, wherein:
said virtual living thing has at least one of a transition probability model which is obtained by modeling transition of generating actions and behaviors of the virtual living thing, a feeling model which is obtained by modeling change of feeling of the virtual living thing, and a growth model which is obtained by modeling the growth of the virtual living thing, and on the basis of the external condition, the internal condition and/or the operation from outside, the transition probabilities corresponding to said transition probability model, parameter values corresponding to said feeling model, and/or the current growth step of the virtual living thing in said growth model are changed as necessity;

said second communication means acquires each of said transition probabilities of said transition probability model, each of said parameter values of said feeling model, and/or a growth step value representing the current growth step in said growth model, as said data for diagnosis for diagnosing said condition of said software of said virtual living thing, from said hardware or said storage medium, and analyzes each of said transition probabilities of said transition probability model, each of said parameter values of said feeling model, and/or said growth step value; and said second communication means diagnoses the character of said virtual living thing as said condition of said virtual living thing.

16. The diagnostic system according to claim 1, wherein:

said virtual living thing has at least one of a transition probability model which is obtained by modeling transition of generating actions and behaviors of the virtual living thing, a feeling model which is obtained by modeling change of feeling of the virtual living thing, and a growth model which is obtained by modeling the growth of the virtual living thing, and on the basis of the external condition, the internal condition and/or the operation from outside, the transition probabilities corresponding to said transition probability model, parameter values corresponding to said feeling model, and/or the current growth step of the virtual living thing in said growth model are changed as necessity;

wherein said second communication means performs a first step to acquire each of said transition probabilities of said transition probability model, each of said parameter values of said feeling model, and/or a growth step value representing the current growth step in said growth model, as said data for diagnosis for diagnosing said condition of said software of said virtual living thing, and analyze obtained each of said transition probabilities of said transition probability model, each of said parameter values of said feeling model, and/or said growth step value; and a second step to diagnose the character of said virtual living thing as said condition of said virtual living thing on the basis of analysis result.

17. A diagnostic system, comprising:

first communication means provided on a user side of a robot apparatus;

second communication means provided on a service providing side which provides a service to examine hardware or software of said robot apparatus; and a communication line for connecting said first and second communication means, and wherein:

said first communication means transmits data for diagnosis necessary for diagnosing the condition of said hardware or said software of said robot apparatus, to said second communication means through said communication line; and said second communication means analyzes said data for diagnosis, which is given from said first communication means, and diagnoses said condition of said hardware or said software of said robot apparatus, on the basis of the analysis result.

18. The diagnostic system according to claim 17, wherein:

said second communication means transmits said diagnosis result to said first communication means through said communication line; and said first communication means comprises display means for visually displaying said diagnosis result, which is obtained from said second communication means.

19. The diagnostic system according to claim 17, wherein:

said robot apparatus has at least one of a transition probability model which is obtained by modeling transition of generating actions and behaviors of the robot apparatus, a feeling model which is obtained by modeling change of feeling of the robot apparatus, and a growth model which is obtained by modeling the growth of the robot apparatus, and on the basis of the external condition, the internal condition and/or the operation from outside, the transition probabilities corresponding to said transition probability model, parameter values corresponding to said feeling model, and/or the current growth step of the robot apparatus in said growth model are changed as necessity;

said first communication means transmits each of said transition probabilities of said transition probability model, each of said parameter values of said feeling model, and/or a growth step value representing the current growth step in said growth model, as said data for diagnosis for diagnosing said condition of said software of said robot apparatus, to said second communication means; and said second communication means analyzes each of said transition probabilities of said transition probability model, each of said parameter values of said feeling model, and/or said growth step value, and diagnoses the character of said robot apparatus as said condition of said robot apparatus on the basis of the analysis result.

20. The diagnostic system according to claim 19, wherein:

said second communication means:

transmits question data to ask said user of said robot apparatus how to breed the robot apparatus, to said first communication means, after diagnosing said character of said robot apparatus; and performs predetermined counseling processing on the basis of said user's answers to the questions, which are transmitted from said first communication means, and said data for diagnosis of the robot apparatus, and transmits the counseling result, obtained through the counseling processing, indicating how to breed the robot apparatus, to said first-communication means.

21. The diagnostic system according to claim 17, wherein:

said second communication means transmits a problem diagnostic program which is a computer program to diagnose the condition of said hardware of said robot apparatus;

said first communication means examine if said hardware of said robot apparatus has any problems, on the basis of the problem diagnostic program, and transmits the examination result to said second communication means; and said second communication means analyzes the examination result, which is transmitted from said first communication means, and diagnoses the presence or absence of a problem on the basis of the analysis result as said condition of said hardware of said robot apparatus.

22. The diagnostic system according to claim 21, wherein said second communication means informs a predetermined service center of data related to a problem and/or necessary data including the serial number of said robot apparatus, which is obtained via said first communication means, in the case where said hardware keeping said robot apparatus has the problem.

23. The diagnostic system according to claim 21, wherein said second communication means transmits a destination of a repair request to said first communication means in the case where said hardware of said robot apparatus has a problem.

24. A diagnostic method, comprising:
a first step of transmitting data for diagnosis necessary for diagnosing the condition of said software or said hardware of a robot apparatus, from first communication means provided on a user side of the robot apparatus, to second communication means provided on a service providing side which provides a service to diagnosis the condition of the hardware or the software of the robot apparatus; and
a second step of, using said second communication means, analyzing said data for diagnosis, which is given from said first communication means, and diagnosing said condition of said software or said hardware of said robot apparatus on the basis of the analysis result.

25. The diagnostic method according to claim 24, comprising a third step of transmitting said diagnosis result to said first communication means through said communication line from said second communication means, and making said first communication means visually display said diagnosis result.

26. The diagnostic method according to claim 24, wherein:
said robot apparatus has at least one of a transition probability model which is obtained by modeling transition of generating actions and behaviors of the robot apparatus, a feeling model which is obtained by modeling change of feeling of the robot apparatus, and a growth model which is obtained by modeling the growth of the robot apparatus, and on the basis of the external condition, the internal condition and/or the operation from outside, the transition probabilities corresponding to said transition probability model, parameter values corresponding to said feeling model, and/or the current growth step of the robot apparatus in said growth model are changed as necessity;
said first step is to transmit each of said transition probabilities of said transition probability model, each of said parameter values of said feeling model, and/or a growth step value representing the current growth step of the robot apparatus in said growth model, as said data for diagnosis for diagnosing said condition of said software of said robot apparatus, to said second communication means; and
said second step is to analyze each of said transition probabilities of said transition probability model, each of said parameter values of said feeling model, and/or said growth step value, and diagnose the character of said robot apparatus as said condition of said robot apparatus on the basis of the analysis result.

27. The diagnostic method according to claim 26, wherein:
said second step comprises:
a question data transmitting step of transmitting question data to ask said user of said robot apparatus how to breed the robot apparatus, to said first communication means, after diagnosing said character of the robot apparatus;
a counseling processing step of performing predetermined counseling processing on the basis of said user's answers to the questions, which are transmitted from said first communication means and said data for diagnosis of the robot apparatus; and
a counseling result transmitting step of transmitting the counseling result indicating how to breed the robot apparatus, which is obtained through the counseling processing, to said first communication means.

28. The diagnostic method according to claim 26, wherein said first step comprises:
a problem diagnostic program transmitting step of transmitting a problem diagnostic program which is a computer program to diagnose the condition of said hardware keeping said robot apparatus, on said network to said user of said robot apparatus;
an examining step of examining if said hardware of said robot apparatus has any problems, on the basis of the program diagnostic program; and
an examination result transmitting step of transmitting the examination result to said second communication means; and
said second step is to analyze the examination result, which is transmitted from said first communication means, and diagnoses the presence or absence of a problem as said condition of said hardware of said robot apparatus, on the basis of the analysis result.

29. The diagnostic method according to claim 28, wherein said second step comprises an informing step of informing a predetermined service center of data related to a problem and/or necessary data including the serial number of said robot apparatus which is obtained via said first communication means, in the case where said hardware of said robot apparatus has the problem.

30. The diagnostic method according to claim 28, wherein said second step comprises a repair-request-destination informing step of informing said first communication means of a destination of a repair request in the case where said hardware of said robot apparatus has a problem.

31. The diagnostic system according to claim 17, wherein:
said robot apparatus has at least one of a transition probability model which is obtained by modeling transition of generating actions and behaviors of the robot apparatus, a feeling model which is obtained by modeling change of feeling of the robot apparatus, and a growth model which is obtained by modeling the growth of the robot apparatus, and on the basis of the external condition, the internal condition and/or the operation from outside, the transition probabilities corresponding to said transition probability model, parameter values corresponding to said feeling model, and/or the current growth step of the robot apparatus in said growth model are changed as necessity;
said second communication means acquires each of said transition probabilities of said transition probability model, each of said parameter values of said feeling model, and/or a growth step value representing the current growth step in said growth model, as said data for diagnosis for diagnosing said condition of said software of said robot apparatus, and analyzes each of said transition probabilities of said transition probability model, each of said parameter values of said feeling model, and/or said growth step value; and
said second communication means diagnoses the character of said robot apparatus as said condition of said robot apparatus.

32. The diagnostic method according to claim 24, wherein:
said robot apparatus has at least one of a transition probability model which is obtained by modeling transition of generating actions and behaviors of the robot apparatus, a feeling model which is obtained by modeling change of feeling of the robot apparatus, and a growth model which is obtained by modeling the growth of the robot apparatus, and on the basis of the external condition, the internal condition and/or the operation from outside, the transition probabilities corresponding to said transition probability model, parameter values corresponding to said feeling model, and/or the current growth step of the robot apparatus in said growth model are changed as necessity;

said first step is to acquire each of said transition probabilities of said transition probability model, each of said parameter values of said feeling model, and/or a growth step value representing the current growth step in said growth model, as said data for diagnosis for diagnosing said condition of said software of said robot apparatus, and analyze each of said transition probabilities of said transition probability model, each of said parameter values of said feeling model, and/or said growth step value; and said second step is to diagnose the character of said robot apparatus as said condition of said robot apparatus on the basis of the analysis result.

* * * * *